(12) United States Patent
Kaminski, Jr.

(10) Patent No.: US 7,991,206 B1
(45) Date of Patent: Aug. 2, 2011

(54) SURROGATE HEURISTIC IDENTIFICATION

(75) Inventor: Charles F. Kaminski, Jr., Omaha, NE (US)

(73) Assignee: Datascout, Inc., Omaha, NE (US)

(*) Notice: Subject to any disclaimer, the term of this patent is extended or adjusted under 35 U.S.C. 154(b) by 1056 days.

(21) Appl. No.: 11/824,815

(22) Filed: Jul. 2, 2007

(51) Int. Cl.
*G06K 9/00* (2006.01)
*G06K 9/68* (2006.01)

(52) U.S. Cl. .................. 382/124; 382/100; 382/218
(58) Field of Classification Search ............. 382/124, 382/209, 218, 224, 100
See application file for complete search history.

(56) References Cited

U.S. PATENT DOCUMENTS

| | | | |
|---|---|---|---|
| 4,503,514 A | 3/1985 | Urquhart | |
| 4,903,194 A | 2/1990 | Houdek et al. | |
| 5,719,958 A | 2/1998 | Wober et al. | |
| 5,918,223 A | 6/1999 | Blum et al. | |
| 5,973,692 A | 10/1999 | Knowlton et al. | |
| 6,021,491 A | 2/2000 | Renaud | |
| 6,052,486 A | 4/2000 | Knowlton et al. | |
| 6,098,054 A | 8/2000 | McCollom et al. | |
| 6,195,497 B1 | 2/2001 | Nagasaka et al. | |
| 6,212,525 B1 | 4/2001 | Guha | |
| 6,310,966 B1 * | 10/2001 | Dulude et al. | 382/115 |
| 6,594,665 B1 | 7/2003 | Sowa et al. | |
| 6,546,397 B1 | 8/2003 | Rempell | |
| 6,671,407 B1 | 12/2003 | Venkatesan et al. | |
| 6,691,126 B1 | 2/2004 | Syeda-Mahmood | |
| 6,704,730 B2 | 3/2004 | Moulton et al. | |
| 6,748,533 B1 | 6/2004 | Wu et al. | |
| 6,952,730 B1 | 10/2005 | Najork et al. | |
| 6,963,975 B1 | 11/2005 | Weare | |
| 7,046,473 B2 * | 5/2006 | Fu et al. | 360/75 |
| 7,073,197 B2 | 7/2006 | Rabin et al. | |
| 7,080,253 B2 | 7/2006 | Weare | |
| 7,139,747 B1 | 11/2006 | Najork | |
| 7,240,207 B2 | 7/2007 | Weare | |
| 7,302,574 B2 | 11/2007 | Conwell et al. | |
| 7,328,153 B2 | 2/2008 | Wells et al. | |
| 7,460,994 B2 | 12/2008 | Herre et al. | |
| 7,600,125 B1 | 10/2009 | Stringham | |
| 7,624,264 B2 | 11/2009 | Aura et al. | |
| 7,640,354 B2 * | 12/2009 | Bjorner et al. | 709/231 |
| 7,769,794 B2 | 8/2010 | Moore et al. | |
| 7,809,154 B2 * | 10/2010 | Lienhart et al. | 382/100 |
| 2001/0017940 A1 | 8/2001 | Kim et al. | |
| 2001/0044719 A1 | 11/2001 | Casey | |
| 2002/0083060 A1 | 6/2002 | Wang et al. | |

(Continued)

OTHER PUBLICATIONS

Cottingham, John; Notification of Transmittal of the International Search Report and the Written Opinion of the International Searching Authority, or the Declaration; International Application No. PCT/US 07/09816; Date of Mailing Jun. 18, 2008; Form PCT/ISA/220 (1 page); Form PCT/ISA/210 (2 pages); and Form PCT/ISA/237 (6 pages).

(Continued)

*Primary Examiner* — Daniel G Mariam
(74) *Attorney, Agent, or Firm* — Thomas, Kayden, Horstemeyer & Risley, LLP

(57) ABSTRACT

Surrogate heuristic identification is described, including selecting a portion of video content, wherein the portion is standardized, identifying a characteristic associated with the video content, using the characteristic to generate a data representation, the data representation being used to provide heuristic data, and processing the heuristic data to generate a fingerprint configured to compare against one or more stored fingerprints associated with other video content.

21 Claims, 20 Drawing Sheets

U.S. PATENT DOCUMENTS

| | | | |
|---|---|---|---|
| 2003/0086341 A1 | 5/2003 | Wells et al. | |
| 2003/0191764 A1 | 10/2003 | Richards | |
| 2003/0212494 A1 | 11/2003 | Alexander et al. | |
| 2004/0064737 A1 | 4/2004 | Milliken et al. | |
| 2004/0240562 A1 | 12/2004 | Bargeron et al. | |
| 2005/0089216 A1 | 4/2005 | Schiller et al. | |
| 2005/0169529 A1 | 8/2005 | Owechko et al. | |
| 2005/0172312 A1 | 8/2005 | Lienhart et al. | |
| 2006/0031486 A1 | 2/2006 | Miner | |
| 2006/0039561 A1 | 2/2006 | Ypya et al. | |
| 2006/0095654 A1 | 5/2006 | Miller et al. | |
| 2006/0156282 A1 | 7/2006 | Mathew | |
| 2006/0187477 A1 | 8/2006 | Maki et al. | |
| 2006/0195909 A1 | 8/2006 | Boswell et al. | |
| 2006/0235875 A1 | 10/2006 | Wen et al. | |
| 2006/0253491 A1 | 11/2006 | Gokturk et al. | |
| 2007/0021195 A1 | 1/2007 | Campbell et al. | |
| 2007/0050761 A1 | 3/2007 | Hester et al. | |
| 2007/0092103 A1 | 4/2007 | Mihcak et al. | |
| 2007/0101147 A1 | 5/2007 | Brunk et al. | |
| 2007/0198838 A1 | 8/2007 | Nonaka et al. | |
| 2007/0226507 A1 | 9/2007 | Schilling | |
| 2008/0154401 A1 | 6/2008 | Wang | |
| 2008/0229023 A1 | 9/2008 | Plamondon | |
| 2008/0309819 A1* | 12/2008 | Hardacker et al. | 348/553 |
| 2008/0317278 A1 | 12/2008 | Lefebvre et al. | |

OTHER PUBLICATIONS

Reyes, Mariela, D.; U.S. Office Action and Information Disclosure Statement; U.S. Appl. No. 11/408,199; Date of Mailing Jun. 11, 2008; 23 pages.

U.S. Appl. No. 11/408,199, filed Apr. 20, 2006, Charles F. Kaminski, Jr.

U.S. Appl. No. 11/732,838, filed Apr. 5, 2007, Charles F. Kaminski, Jr.

U.S. Appl. No. 11/784,012, filed Apr. 5, 2007, Charles F. Kaminski, Jr.

U.S. Appl. No. 11/732,833, filed Apr. 5, 2007, Charles F. Kaminski, Jr.

U.S. Appl. No. 11/732,832, filed Apr. 5, 2007, Charles F. Kaminski, Jr.

U.S. Appl. No. 11/732,834, filed Apr. 5, 2007, Charles F. Kaminski, Jr.

U.S. Appl. No. 11/732,835, filed Apr. 5, 2007, Charles F. Kaminski, Jr.

U.S. Appl. No. 11/732,842, filed Apr. 5, 2007, Charles F. Kaminski, Jr.

U.S. Appl. No. 11/732,836, filed Apr. 5, 2007, Charles F. Kaminski, Jr.

U.S. Appl. No. 11/824,983, filed Jul. 2, 2007, Charles F. Kaminski, Jr.
U.S. Appl. No. 11/824,973, filed Jul. 2, 2007, Charles F. Kaminski, Jr.
U.S. Appl. No. 11/824,982, filed Jul. 2, 2007, Charles F. Kaminski, Jr.
U.S. Appl. No. 11/824,996, filed Jul. 2, 2007, Charles F. Kaminski, Jr.
U.S. Appl. No. 11/824,924, filed Jul. 2, 2007, Charles F. Kaminski, Jr.
U.S. Appl. No. 11/824,789, filed Jul. 2, 2007, Charles F. Kaminski, Jr.
U.S. Appl. No. 11/824,995, filed Jul. 2, 2007, Charles F. Kaminski, Jr.
U.S. Appl. No. 11/825,001, filed Jul. 2, 2007, Charles F. Kaminski, Jr.
U.S. Appl. No. 11/824,963, filed Jul. 2, 2007, Charles F. Kaminski, Jr.
U.S. Appl. No. 11/824,957, filed Jul. 2, 2007, Charles F. Kaminski, Jr.
U.S. Appl. No. 11/824,960, filed Jul. 2, 2007, Charles F. Kaminski, Jr.
U.S. Appl. No. 11/824,846, filed Jul. 2, 2007, Charles F. Kaminski, Jr.

Sayers, Craig; Eshghi, Kave, The Case For Generating URIs by Hashing RDF Content, Aug. 22, 2002, HPL-2002-216, HP Laboratories Palo Alto.

Lynch, Nancy; Malkhi, Dahlia; Ratajczak, David, Atomic Data Access in Distributed Hash Tables, 2002, pp. 295-305, LNCS 2429, Springer-Verlag Berlin Heidelberg.

Joux, "Multicollisions in Iterated Hash Functions. Application to Cascaded Constructions", International Association for Cryptologic Research 2004, M. Franklin (Ed.): CRYPTO 2004, LNCS 3152, pp. 306-316, 2004.

* cited by examiner

SURROGATE HEURISTIC IDENTIFICATION

CROSS-REFERENCES TO RELATED APPLICATIONS

This application is related to co-pending U.S. patent application Ser. No. 11/408,199, filed Apr. 20, 2006 and entitled "Surrogate Hashing," U.S. patent application Ser. No. 11/824,983, filed Jul. 2, 2007, and entitled "Surrogate Heuristic Identification," U.S. patent application Ser. No. 11/824,973, filed Jul. 2, 2007, and entitled "Surrogate Heuristic Identification," U.S. patent application Ser. No. 11/824,982, filed Jul. 2, 2007, and entitled "Surrogate Heuristic Identification," U.S. patent application Ser. No. 11/824,996, filed Jul. 2, 2007, and entitled "Surrogate Heuristic Identification," U.S. patent application Ser. No. 11/824,924, filed Jul. 2, 2007, and entitled "Surrogate Heuristic Identification," U.S. patent application Ser. No. 11/824,789, filed Jul. 2, 2007, and entitled "Surrogate Heuristic Identification," U.S. patent application Ser. No. 11/824,995, filed Jul. 2, 2007, and entitled "Surrogate Heuristic Identification," U.S. patent application Ser. No. 11/825,001, filed Jul. 2, 2007, and entitled "Surrogate Heuristic Identification," U.S. patent application Ser. No. 11/824,963, filed Jul. 2, 2007, and entitled "Surrogate Heuristic Identification," U.S. patent application Ser. No. 11/824,957, filed Jul. 2, 2007, and entitled "Surrogate Heuristic Identification," U.S. patent application Ser. No. 11/824,960, filed Jul. 2, 2007, and entitled "Surrogate Heuristic Identification," U.S. patent application Ser. No. 11/824,846, filed Jul. 2, 2007, and entitled "Surrogate Heuristic Identification," all of which are herein incorporated by reference for all purposes.

FIELD OF THE INVENTION

The present invention relates generally to searching using processing systems. More specifically, surrogate heuristic identification is described.

BACKGROUND OF THE INVENTION

Information on the Internet and World Wide Web is available in various forms, formats, types, and amounts. The Internet has been a valuable medium for enabling the proliferation of information. However, locating copies of information or data is a difficult task using various types of conventional techniques.

Some conventional techniques rely upon the use of locating or identifying keywords or text associated with a given image, document, photo, picture, song, or other digital data file ("file"). Keywords or text (e.g., metadata) may be associated with a given file to enable search engines, crawlers, bots, and other search applications to find files based on the keywords or data. However, keywords or text do not necessarily indicate the actual content of a given file. For example, a keyword "tree" may be assigned and used to identify the picture of a river. As another example, metadata using keywords describing a public personality may be used to describe a web page associated with a completely different personality. In other words, conventional techniques that use keywords and metadata to locate files are typically inaccurate and inefficient.

Other conventional solutions may rely upon the use of identifying objects within certain types of files. However, object data within a file may be obscured or modified such that conventional techniques are unable to locate and identify copies of a given file that may be slightly different from each other because of artifacts that are located within the image, video, audio, or other data.

Thus, what is needed is a solution for identifying data without the limitations of conventional techniques.

BRIEF DESCRIPTION OF THE DRAWINGS

Various examples are disclosed in the following detailed description and the accompanying drawings.

DETAILED DESCRIPTION

Figure 1:
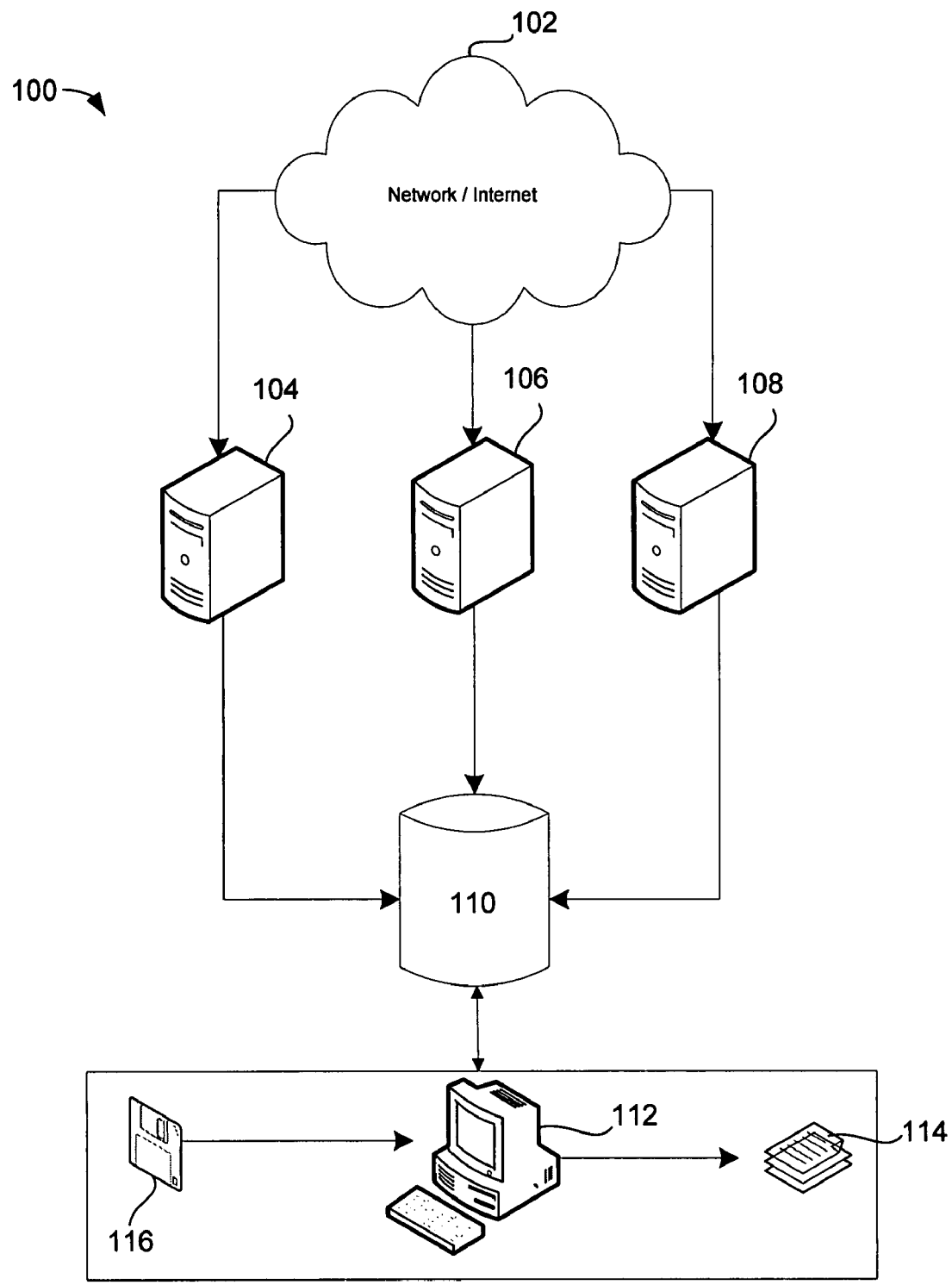
FIG. 1 illustrates an exemplary surrogate heuristic identification system.

Various examples or embodiments ("examples") may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

In some examples, the described techniques may be implemented as a computer program or application ("application"). The described techniques may also be implemented as a module or sub-component of another application. Here, the described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, and Fireworks® may also be used to implement the described techniques. The described techniques may be varied and are not limited to the examples or descriptions provided.

Techniques for surrogate heuristic identification are described. In some examples, identifying content within files or data streams (i.e., collections or logical groupings of data that, when instantiated, rendered, or otherwise processed, result in an image, video, audio, multimedia content, picture, or other type of content) from various locations on a network (e.g., the Internet). In some examples, surrogate heuristic identification may be used to identify content such as a portion of an image or video, or an image or video. Content ("content") describes information that may be experienced and that may be substantially similar in appearance (i.e., when displayed on a screen or monitor), but may also be different at a data level. In some examples, "data level" may refer to a level or layer of, for example, the Open Systems Interconnection (OSI), Internet, or other types of data representations and models used to describe interoperability of data communication systems. As an example, a clip from a movie may be content even though a data representation may be substantially different than another file due to, for example, encoding schemes or other content provided with the clip. In other examples, surrogate heuristic identification may be used to identify portions of a file or data stream. Likewise, an entire file or data stream may be identified if image, video, or audio (i.e., sound) data is provided that may be rendered into image, video, or audio (i.e., sound) form. In some examples, file or content identification may be performed using a histogram or other type of data representation (i.e., graphical or otherwise) for a characteristic of an image. In other examples, data used to plot a histogram may be used for file or content identification without plotting (i.e., generating) the histogram or other data representation (e.g., bar graph, pie chart, and others). Histogram values may be used for comparison or stored for future comparison. Other attributes may be used in conjunction with histogram values for content identification. In other examples, histogram values may be used to generate a series of vectors used to identify the content. These vector values may be used for comparison or stored for future comparison. Other attributes may be used in conjunction with vector values for content identification. In yet other examples, histogram values, vector values, a combination thereof, or other data types and values without limitation may be used with or without other attributes to generate one or more signatures or fingerprints ("fingerprint"). Fingerprints may represent a file, data stream, portion of a file, portion of a data stream, a segment of content (such as an image piece, video clip, sound byte, etc.), or the whole content. Fingerprints may be encoded histogram values, vector values, vector data, heuristic data, a combination thereof, or other types of data. Other data may be included in fingerprints. Fingerprints may also be hashed (e.g., MD5 hash, and others) to generate values from histogram data. Hashed values derived from vector data, hashed values derived from other data (such as binary data), or any combination there of may be used. These fingerprints may be used for comparison or stored for future comparison. Other attributes may be used in conjunction with fingerprints for content or file identification. For example, another image may have one or more histograms generated, and the vectors of those histograms may be used to generate a fingerprint for a given file or data stream, which may be further used to generate a hash value using the vectors. Hashing algorithms and techniques may be used to generate hash values, such as those described in U.S. patent application Ser. No. 11/408,199, filed on Apr. 20, 2006, entitled "Surrogate Hashing," which is incorporated herein by reference for all purposes. In other words, vectors may be used to index, store, and compare histogram values. Fingerprinting is a way to index, store, and compare vectors or histograms. Vectors, histograms, or a combination thereof may be used to perform content identification using the techniques described herein. In other examples, identification may be performed for other types of files or content, such as audio, by using various characteristics (e.g., frequencies, high or low tones, volumes, and others) to generate histogram data that may be used with the techniques described. A characteristic may be any quantifiable property of an image or a portion of an image that may be resolved into a given value. For example, a characteristic may be the brightness, color, tone, hue, luminance, red/green/blue value, volume, frequency, tone, pixel density, pixel count, and others for various types of files and data streams. A characteristic may also be the rate or degree of change in an attribute. A histogram may be a graph that records counts of a characteristic at various levels. For example, a histogram may be generated to indicate a number of pixels having a brightness value of 50 or a number of pixels having a green value of 75. In other examples, a histogram may also be generated to represent change in a characteristic (e.g., brightness, contrast, and others) from, for example, surrounding pixels or between pixels. A pixel may describe a "picture element" as an abstract sample and is not necessarily the smallest possible sample (i.e. a dot or square). In other words, a pixel may represent an abstract sample of a file or content (e.g., image, video, audio, and others), but does not necessarily refer to the smallest picture element in, for example, an image. Pixel may be calculated from smaller parts by methods that may include, for example, average value, maximum value, minimum value, or other. Multiple images may be normalized so that each image includes the same number of pixels. In some examples, histogram values may be discrete or may be grouped in ranges. In other examples, histograms axes may be adjusted (e.g., logarithmic axis) or normalized for given types of content. In still other examples, histogram values on modified axis may be adjusted to reflect relative distances. Further, histogram and vector values may be calculated at various significant figures (i.e. 10.0121, 10.012, 10.01, 10.0, 10, 0, and others). As another example, fingerprints may be stored in a repository (e.g., database, data mart, data warehouse, storage area network, and the like) and may be later retrieved for use in identifying content, files or data streams. In other examples, the described techniques may be varied and are not limited those provided.

FIG. 1 illustrates an exemplary surrogate heuristic identification system. Here, system 100 includes network 102 coupled, indirectly or directly, to servers 104-108, repository 110, computing device 112, output data 114, and input data 116. Here, crawlers (not shown) may be implemented or installed on servers 104-108 and used to search or "crawl" the Internet or another data network (e.g., private networks such as local area networks (LANs), wide area networks (WAN), municipal area networks (MAN), wireless local area networks (WLAN), and others) to find and identify content, files or data streams. In some examples, when content, files or data streams are found, characteristics or attributes (e.g., brightness, color, tone, hue, luminance, red/green/blue value, volume, frequency, tone, pixel density, pixel count, and others) may be used to identify content, files, or data streams using the techniques described. In some examples, a fingerprint may be used in a search against other fingerprints stored in repository 110, to identify any matches. Matches may be ranked based upon, for example, similarity to fingerprints used in a search. If a match is found, then a location for the identified segment of content, file or data stream may be returned. In other examples, if a match is not found, then the fingerprint may be stored, along with a location (e.g., uniform resource locator or other URL) in repository 110. Further, after developing fingerprints for files or content found on, for example, the Internet, other fingerprints stored in repository 110 may be compared in order to determine if the files or content being identified is similar. In some examples, when a match is identified, further actions may be taken to enforce intellectual property rights, licenses, injunctions to prevent further illegal dissemination, or the like.

Figure 2:
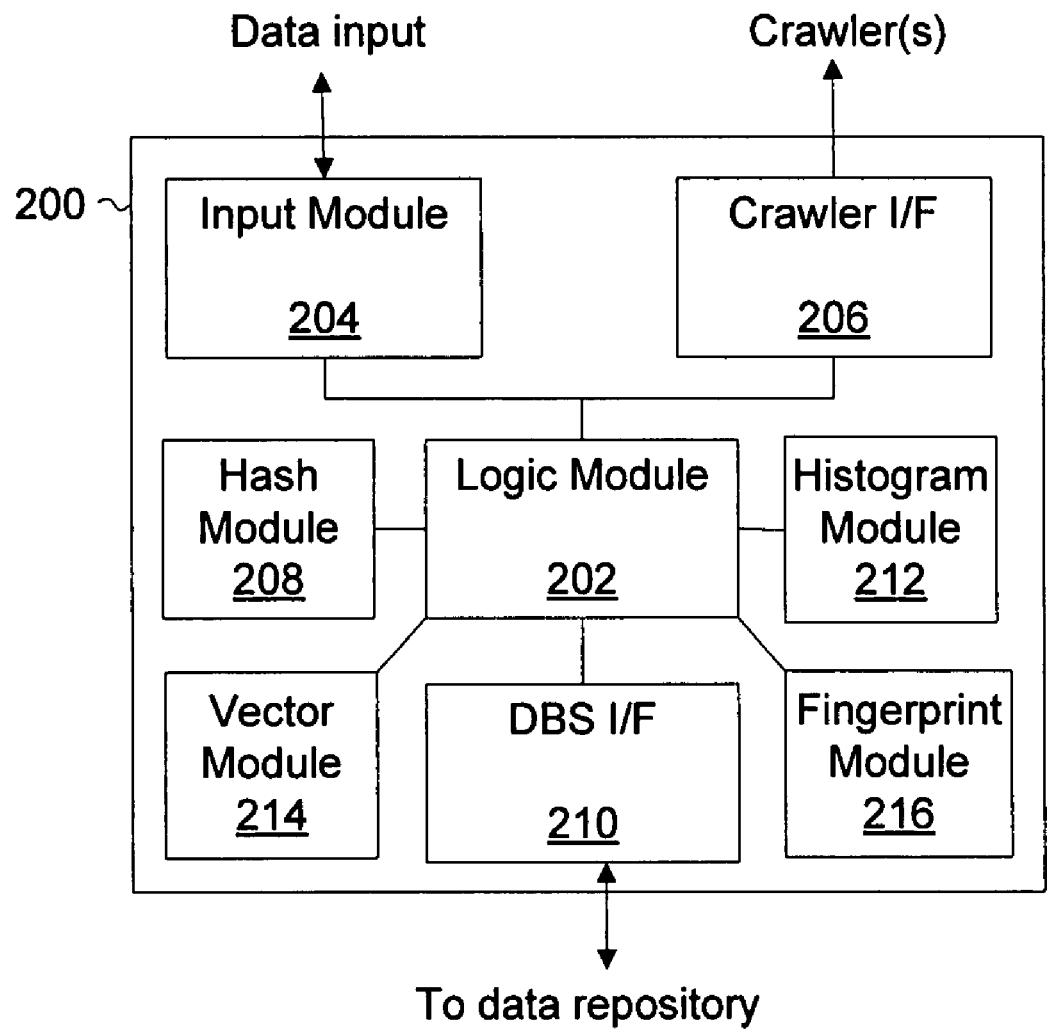
FIG. 2 illustrates an exemplary application architecture for surrogate heuristic identification.

FIG. 2 illustrates an exemplary application architecture for surrogate heuristic identification. Here, application 200 may include logic module 202, input module 204, crawler interface (I/F) 206, hash module 208, database system I/F 210, histogram module 212, vector module 214, and fingerprint module 216. Here, logic module 202 may guide the operation of application 200 and the various elements (e.g., input module 204, crawler interface (I/F) 206, hash module 208, database system I/F 210, and histogram module 212, vector module 214, and fingerprint module 216) shown. In some examples, input module receives input via input module 204. Data may be sent/received between application 200 and crawlers using crawler I/F 206. Hash module 208, may be used to run hashing algorithms against values associated with fingerprints, vectors, or other data associated with a file in order to generate hash values. In some examples, vector module 214, may be used to generate vector data from histogram module 212. Likewise, fingerprint module 216 may be used to generate fingerprints from hash module 208, histogram module 212, and vector module 214, which may be stored in repository 110 (FIG. 1) using database system (DBS) I/F 210. Further, histogram module 212 may be used to generate histograms using data associated with files found by crawlers. In other examples, other types and forms of data representations (e.g., bar charts, pie charts, and others) may be used and are not limited to those shown. Different modules may be used to replace histogram module 212 in order to implement different types and forms of data representations. Further, application 200 and the above-described elements may be varied and are not limited to the descriptions provided.

Figure 3:
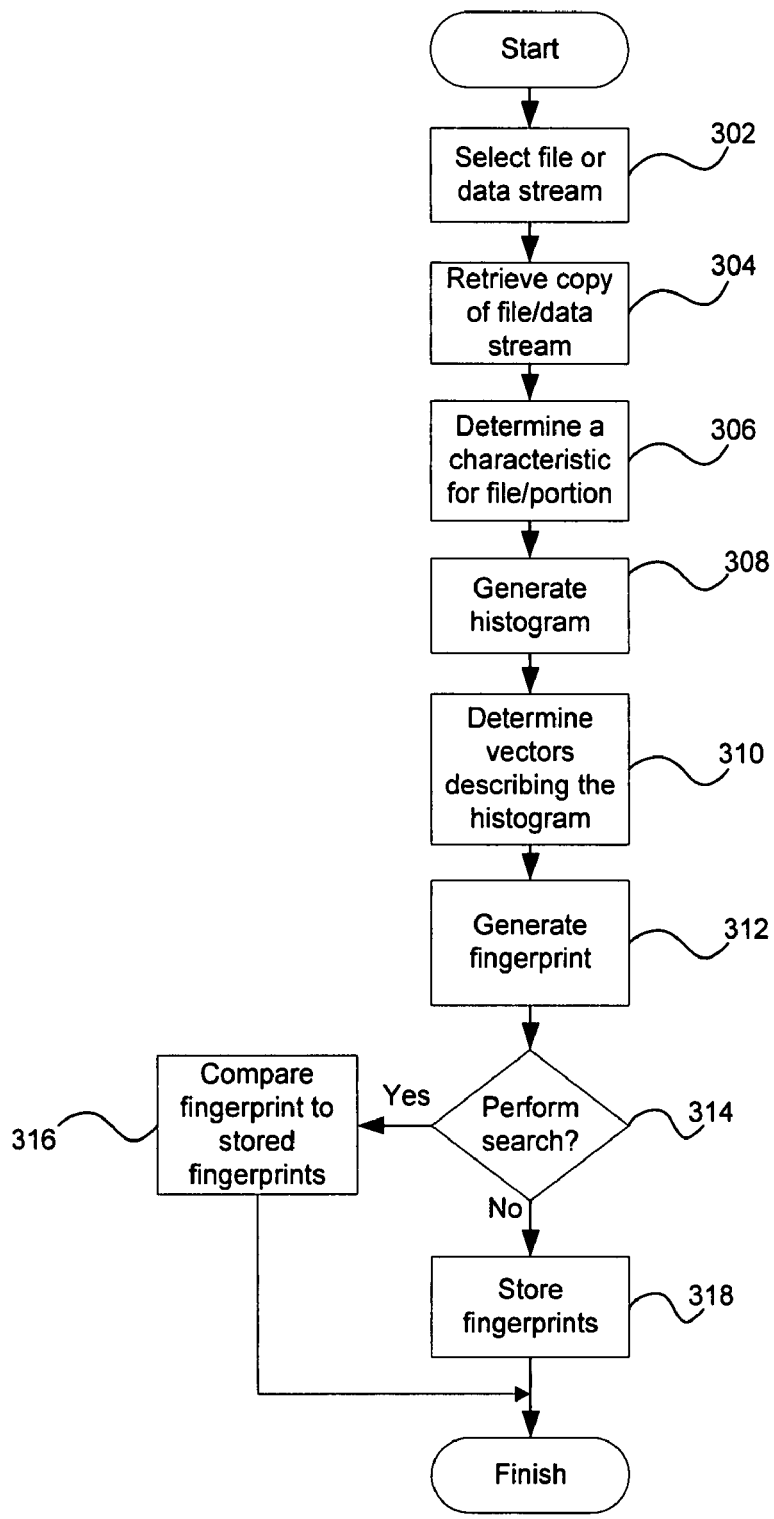
FIG. 3 is an exemplary process for surrogate heuristic identification.

FIG. 3 is an exemplary process for surrogate heuristic identification. Here, a file or data stream is selected (302). A copy of the file or data stream is retrieved or accessed (304). A characteristic may be determined for the type of file, data stream or portion thereof (306). Using the characteristic (e.g., color channel, frequency, pixel data, pixel count, and others), a histogram is generated for the file, data stream, or portion thereof (308). Using the histogram, vectors are determined (310). Fingerprints may be generated using histogram data, vector data, other data, or a combination thereof, which is associated with a given file, data stream, content or portion thereof (312). After generating a fingerprint, a determination is made as to whether a search is performed using the fingerprints (314). In some examples, fingerprints may be compared against other fingerprints stored in, for example, repository 110 (FIG. 1) (316). In other examples, a search may not be performed and one or more fingerprints may be stored (318). In other examples, the above-described process may be varied and is not limited to the examples provided above.

As an example, image or video content may be identified using the above-described processes. For example, images may be identified by creating a fingerprint for each image found on a network (e.g., Internet, world wide web, private or corporate LAN, and others), data base (e.g., repository 110 (FIG. 1)), and others. A fingerprint may be generated for an image, video, audio, picture, photo, multimedia, or other type of content. Once generated, a fingerprint may be compared to previously-stored fingerprints. If a match is found with a stored fingerprint, the location or address of the file or data stream associated with the generated fingerprint may be returned.

A file or data stream may be used to, for example, render an image. In some examples, a source file may be used to generate multiple instantiations, objects, or renderings of the image using an encoder/decoder ("codec") to encode/decode data that, for example, may be used to generate a bitmap image. For example, an image may be stored in the joint picture experts group (JPEG) format, which may be decoded using a JPEG decoder. Various types of codecs may be used and are not limited to any particular type. In some examples, a decoded file or data stream intended for display on a screen or user interface, for example, may be fingerprinted using the above-described process. Images may include any file or data stream that may be rendered on a display, including documents, portable documents, spreadsheets, slideshows, videos, photos (i.e., digital photographs), collections of pixel data, and others. In other examples, the above-described process may be performed on other types of files (e.g., audio, video, multimedia, multi-frame, and others). Regardless of file or data stream type, surrogate heuristic identification may be performed by selecting a standardized portion of an image, file, or data stream (i.e., encoded heuristic data or heuristic data). For example, a number of images may be used to generate fingerprints for each image using a portion selected from a consistent location, area, or part of content (i.e., standardized). In other words, a standardized set of data (i.e., data set) may be selected from each image and used to create a fingerprint. In some examples, by retrieving portions of content, bandwidth and processor requirements may be reduced, allowing faster processing times and increasing the amount of content, the number of files, or data streams that may be fingerprinted.

Here, a histogram may be used to determine vectors and, subsequently, fingerprints for content. In other examples, content such as an entire file, image, video, audio, movie clip, or the like may be selected as a standardized portion. Here, a threshold size for a portion may be established. If a file or data stream has an amount of content that is less than or equal to the threshold file size, the entire (e.g., complete set, file, group, or other collection of) content may be used as a portion to plot a histogram from which to derive vectors that are used to generate a fingerprint. In other examples, multiple portions may be selected. Here, each portion may be used to generate fingerprints for a piece of content. A characteristic or attribute of a given type of file or data stream may be used as inputs for plotting points using a coordinate system for a histogram. In other examples, counting the number of occurrences of a given characteristic or attribute may be used to construct graphical or other types of data representations and models (e.g., pie charts, bar charts, and others) other than a histogram. In other words, different techniques may be used to analyze events, occurrences, incidences, and other characteristics or attributes. For example, stochastic techniques may be used to analyze seemingly random occurrences of a given characteristic or attribute of an audio file, but when plotted using a histogram, a pattern may emerge or vectors may be plotted. In some examples, these may be used to generate a fingerprint. A histogram may be generated by using measurements of the same characteristic for every portion of a file or data stream.

In some examples, vectors generated using a histogram may be used to create a fingerprint for content (i.e., a portion). In other examples, vectors may be determined using a small amount of data selected from a file or data stream as a standardized portion. In other words, the amount of data in a selected portion may be varied to include a set of data (i.e., dataset) chosen from some or all data associated with a file or data stream. Fingerprints may include all data associated with a histogram or a portion of a histogram. For example, a histogram may be plotted with ten discrete levels, for example, that represent brightness levels 1-10 for pixels in an image. By counting the number of pixels within the various brightness levels, the number or "counts" of pixels may be used to plot a histogram. In other examples, different characteristics other than brightness may be used. For example, in an audio file, frequencies and amplitudes associated with a sound wave may be plotted and used to generate a histogram.

Figure 4A:
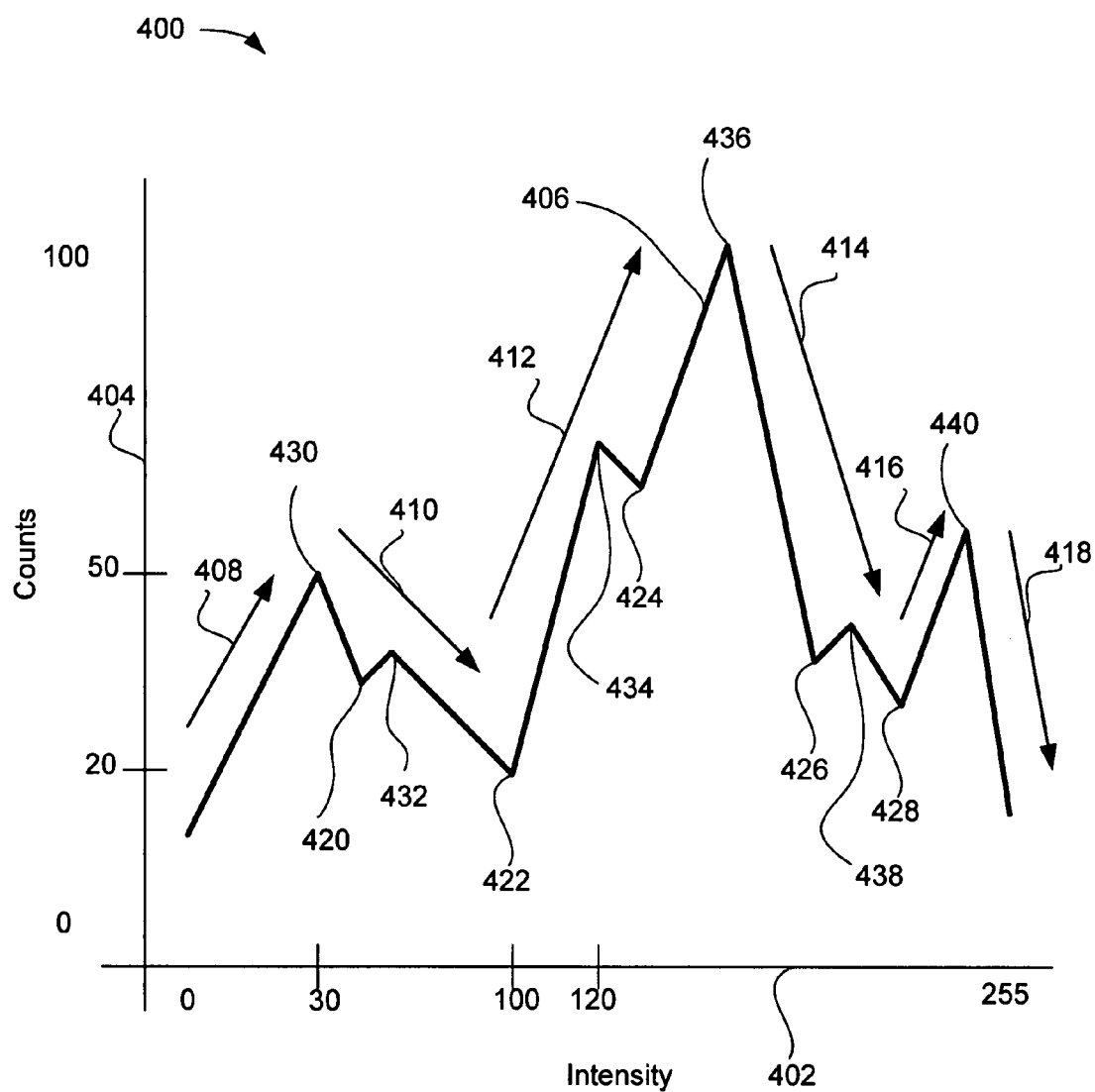
FIG. 4A illustrates an exemplary data representation used for surrogate heuristic identification.

FIG. 4A illustrates an exemplary data representation used for surrogate heuristic identification. Here, histogram 400 may be a histogram of a characteristic (e.g., visual, aural, imagery, multimedia, and others) associated with a segment (i.e., portion) of content. In some examples, a pixel count for an image may be used as a characteristic to provide data for plotting points using, for example, a Cartesian coordinate system, as indicated by axis 404. Each full or partial (i.e., portion) segment of content used for surrogate heuristic identification may have a histogram, vectors, fingerprint, or a combination thereof. Histogram 400 may represent various levels (e.g., 0 to 255) along axis 402 and a pixel count along axis 404. For example, there may be approximately ten (10) pixels having a brightness (i.e., intensity) value of zero in the image or a portion of the image represented by histogram 400. Line graph 406 may show the relative intensity level of a predetermined visual characteristic along axis 402. For example, line graph 406 may illustrate a selected portion having a high number of pixel counts in approximately the 180 intensity range.

In some examples, histogram 400 may be used to develop a fingerprint for a portion of content. Fingerprints from one or more selected portions may be used to identify an image, video, audio, multimedia, or other type of content. Further, fingerprints may be compared against other stored fingerprints to determine whether the content undergoing surrogate heuristic identification is substantially similar to other content. In some examples, vectors 408-418 may be used to derive values associated with a given item of content. Vectors 408-418, troughs 420-428, and peaks 430-440 may be used to perform vector analysis using various types of techniques to derive one or more fingerprints for a given segment of content. In other examples, the above-described techniques may be varied and are not limited to those shown and described. Further, different data representations other than histograms may be used and are not limited to the examples shown and described.

Figure 4B:
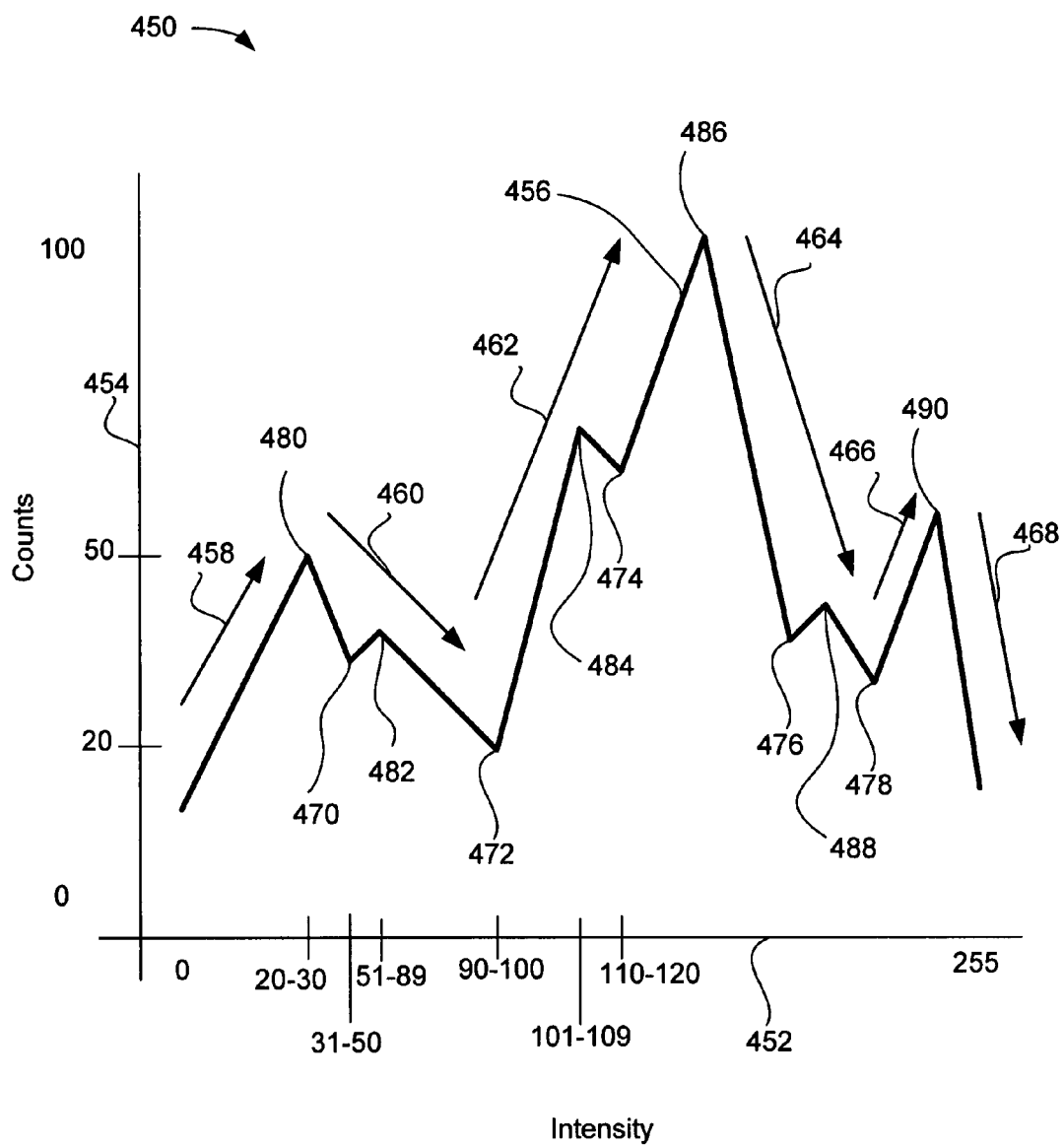
FIG. 4B illustrates an alternative exemplary data representation used for surrogate heuristic identification.

FIG. 4B illustrates an alternative exemplary data representation used for surrogate heuristic identification. Here, histogram 450 includes axes 452-454, line graph 456, vectors 458-468, troughs 470-478, and peaks 480-490. In some examples, histogram 450 may be a histogram of a characteristic (e.g., visual, aural, imagery, multimedia, and others) associated with a given segment of content. Histogram 450 may be used to perform vector analysis on vectors 458-468. In some examples, fingerprints may be developed by using data associated with histogram 450 and each of vectors 458-468 (e.g., angle (i.e., direction), magnitude, and the like) as inputs to surrogate hashing techniques such as those described above. Other data may be used in conjunction with histogram data and vectors. With regard to FIGS. 4A and 4B, tolerances may be adjusted by rounding vector data (e.g., angle measurements, magnitudes, and the like). As an example, if a given vector has an angle of 30.77 degrees and a magnitude of 10.25, these vector data values may be rounded to an angle of, for example, thirty-one (31) degrees and a magnitude of 10, thus increasing vector analysis and surrogate hashing tolerances while reducing data storage and processing requirements. In other words, higher degrees of accuracy of vector data and analysis may be reduced in order to reduce storage and processing requirements. Using surrogate hashing techniques, fingerprints may be generated as a number, set of characters, or as machine-readable data that substantially uniquely identifies a given segment of content. Once generated, fingerprints from one or more selected portions may be used to identify an image, video, audio, multimedia, or other type of content. As described above, line graph 456 may be resolved into a set of vectors (e.g., vectors 458-468) using troughs 470-478 and peaks 480-490. Data associated with vectors 458-468 and histogram values may be used as inputs to surrogate hashing techniques (e.g., algorithms, formulae, and the like). Further, data may be measured in terms of intensity (i.e., x-axis) and pixel counts (i.e., y-axis). In terms of intensity, intensity levels may be grouped (e.g., 20-30, 90-100, 110-120, and others) or placed in "buckets" along axis 452. Buckets, in some examples, may be pre-determined groups, sizes, or quantities of a given measurements found along axis 452-454. For example, a bucket may include intensity levels 20-30, 90-100, 110-120, and the like. A bucket may also be used to describe groupings of pixel counts (not shown) along axis 454. In yet other examples, pixel sizes and sampling rates may be modified so that content that differs substantially in size, quality, or other factor may be compared. In other examples, pixel counts may also be individually indicated or grouped along an axis. In still other examples, axes 452-454 may be implemented differently. For example, minimum (e.g., 0) and maximum (e.g., 255) values may be chosen differently and are not limited to the examples shown. In some examples, the axis of the histogram may be normalized or other scales may be used (e.g., logarithmic scales). Point values used in a histogram may be adjusted to accurately represent a position against a standard axis. If groupings of measurements are used, normalization techniques may be used to reduce or eliminate distortion along axes 452-454. In other words, data associated with vectors 458-468 may be normalized to allow groupings as well as individual measurements to be used without distorting histogram 452. As another example, brightness channel (i.e., intensity) values may be increased or decreased. Yet another example may include shifting values left or right (i.e., for intensity values) or up and down. In other examples, data may be evaluated using techniques other than vector analysis and using histogram 452. Further, histogram 452 may be implemented differently and is not limited to the examples provided.

Figure 5A:
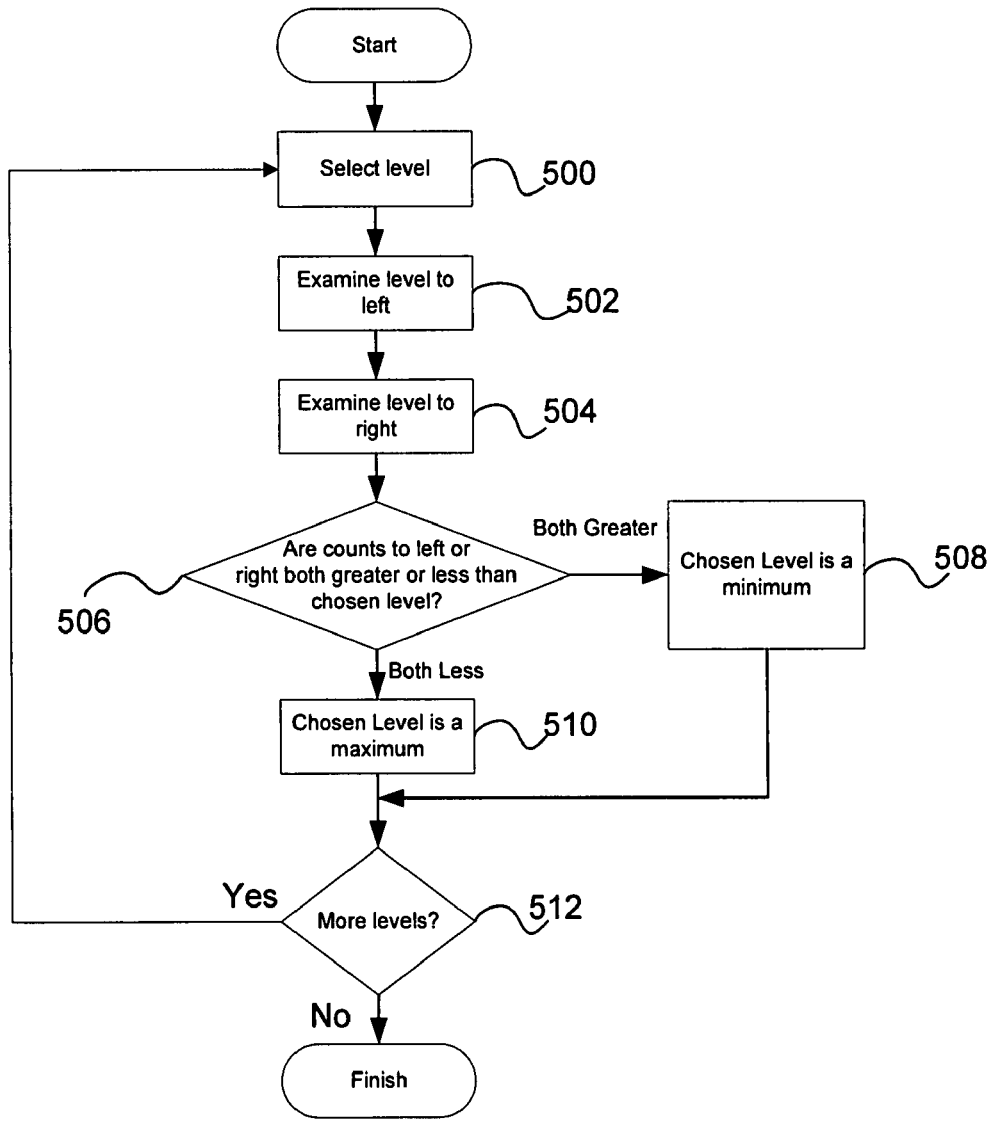
FIG. 5A is an exemplary process for developing a data representation for surrogate heuristic identification.

FIG. 5A is an exemplary process for developing a data representation for surrogate heuristic identification. Here, a histogram is used as a data representation for evaluating selected portions of content for surrogate heuristic identification. In some examples, a level is selected (500). In some examples, a level may include, for example, a bucket for a value along axis 402 (FIG. 4A) into which counts are collected. For example, the level may be an intensity of 100, at which there may be 20 counts. The level to the left (i.e., along axis 402 (FIG. 4A) of the chosen level is examined (502). For example, as shown here, the level with the intensity of 99 may have 25 counts. The level to the right of the chosen level is examined (504). In this example, the level with the intensity of 101 may have 25 counts. A determination is made as to whether the counts of the levels to the left and the right of a chosen level are both greater or less (506). If the counts of the levels to either side of the chosen level are both greater (i.e., suggesting the chosen level is a minimum), then the chosen level is identified as a minimum (508). If the counts of the levels to either side of the chosen level are both less, then the chosen level is identified as a maximum (510). A determination is made as to whether there are any more levels to examine (512). If there are more levels to examine, another level is selected (500). The above-described process may be varied in design, order, and implementation and is not limited to the examples provided.

Figure 5B:
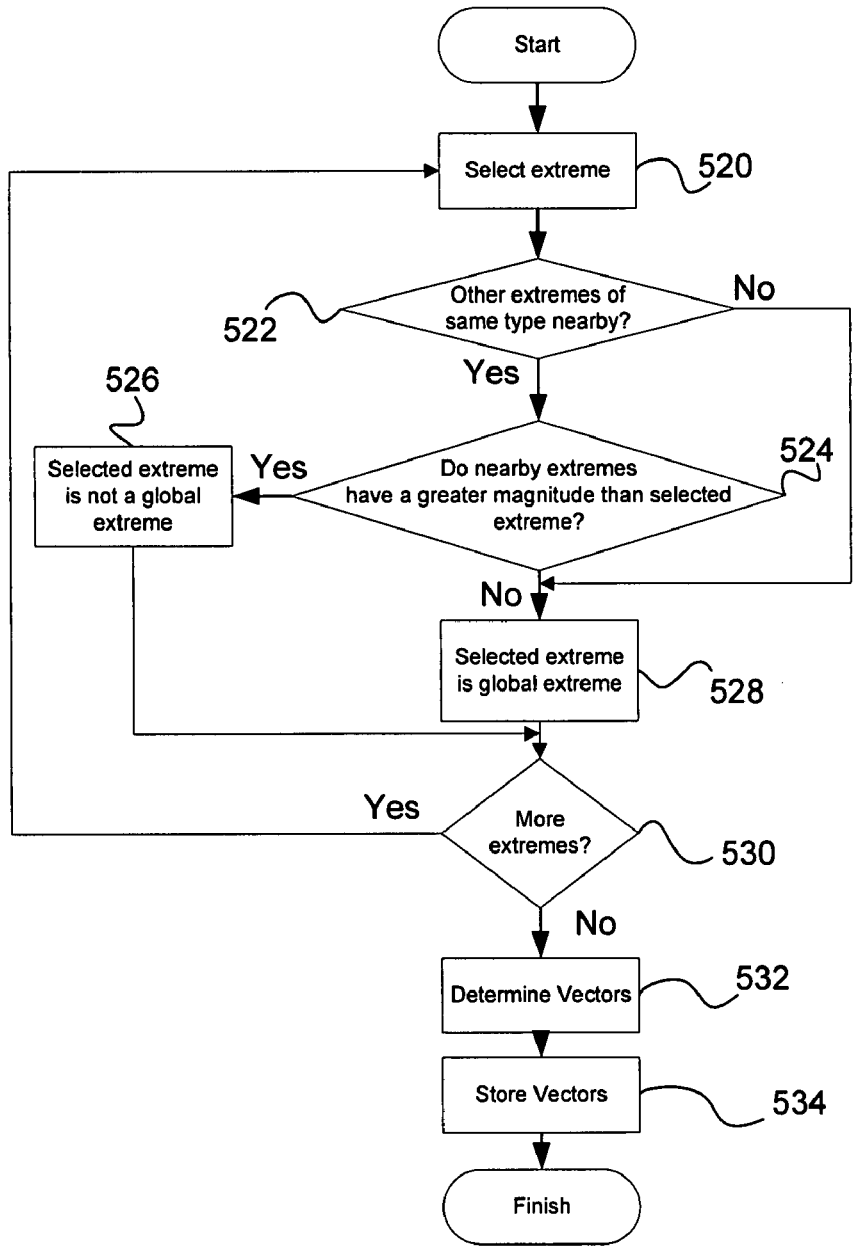
FIG. 5B is a further exemplary process for developing a data representation for surrogate heuristic identification.

FIG. 5B is a further exemplary process for developing a data representation for surrogate heuristic identification. Here, an extreme (e.g., an absolute maximum or absolute minimum) is selected (520). A determination is made as to whether other extreme values ("extremes") are nearby or in substantially close proximity (e.g., an adjacent peak or trough) (522). If other extremes are nearby, then another determination is made as to whether the nearby extremes have a greater magnitude than the selected extreme (524). If the nearby extremes have a greater magnitude than the selected extreme, then the selected extreme is not identified as a global extreme (526). If the nearby extremes are not greater in magnitude than the selected extreme, then it is identified as a global extreme, which may also be the determination if no other extremes are nearby (528). Another determination is made as to whether there are other extreme of the same type (e.g., if the chosen extreme is a minimum, whether there is another minimum) within a certain distance (i.e., nearby) from the chosen extreme (530). For example, the maximum 436 is within 40 levels of the maximum 434 (FIG. 4A). If there are no other extremes, then vectors may be determined, as described below (532). However, if other extremes are nearby, a determination is made as to whether the extreme has a greater magnitude than the selected extreme (e.g., if a maximum is higher or a minimum is lower). For example, the magnitude of maximum 436 (FIG. 4A) may be greater than the magnitude of the maximum 434 (FIG. 4A). If the magnitude of the extreme is greater, the selected extreme is not a global extreme. For example, maximum 436 is not a global extreme because maximum 436 is nearby and has a greater magnitude. Alternatively, maximum 436 is a global extreme. If other extremes do not have a greater magnitude, then the extreme is chosen as a global minimum or maximum. If there are more extremes, another extreme is selected (520).

If there are no more extremes, vectors may be determined (532). In some examples, vectors may be determined by finding a distance and angle between each adjacent point, each adjacent extreme, or each adjacent global extreme. For example, vector 410 (FIG. 4A) may be determined by finding the distance and angle between maximum 430 and minimum 422 (FIG. 4A). Maximum 430 may represent 50 counts at 30 units of intensity, and minimum 422 may represent 20 counts at 100 units intensity. Vector 410 may be determined, for example, as arctan $$\left(\frac{-30}{70}\right) = -23.2°$$

from axis 402.

The magnitude of vector 410 may be determined, for example, as $\sqrt{70^2+(-30)^2}=76.2$ using, for example, the Pythagorean Theorem.

In some examples, angles and magnitudes of vectors may be stored and used, for example, as fingerprints of selected content or segment of content (534). For example, a fingerprint for vector 410 may be "-232762," indicating that vector 410 is -23.2° from the vertical and has a magnitude of 76.2 units. In other examples, vectors may be hashed using techniques such as those described above. Further, hashing vectors may be useful where many vectors for a single image, file, data stream, or other content are stored.

In some examples, more or fewer significant figures of the fingerprint may be stored to increase or reduce the tolerance of surrogate heuristic identification. In other words, a fingerprint of vector 410 may be reduced to a single significant figure and stored as "-2080", indicating -20° from the vertical and 80 units of length. When searching for an image using the fingerprints, a reference image with fewer significant figures may increase the tolerance of the image identification. In other examples, the techniques described above may be applied to other histograms without limitation (e.g., FIG. 4B). In other examples, the above-described identification process may be varied and is not limited to the descriptions provided.

Figure 6:
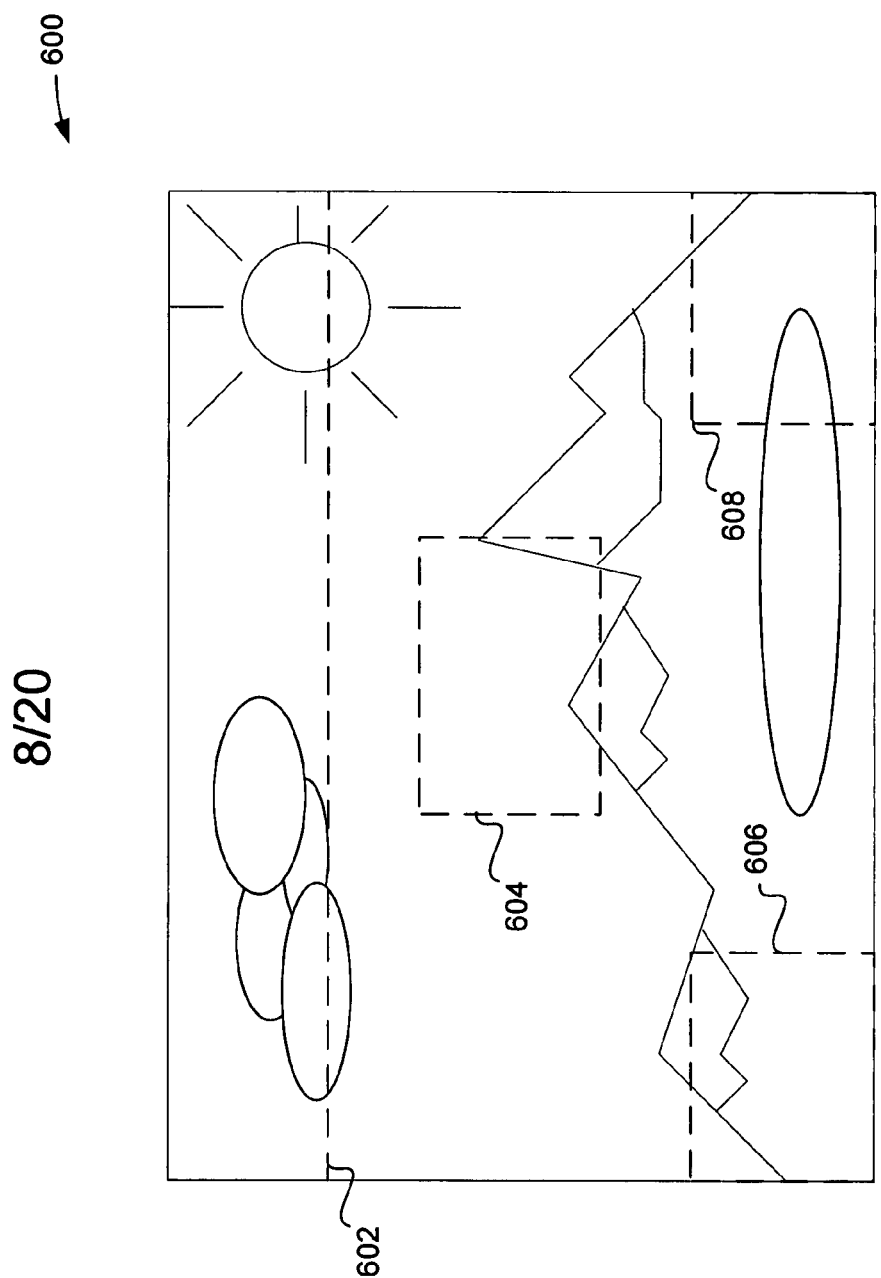
FIG. 6 illustrates an exemplary image used for surrogate heuristic identification.

FIG. 6 illustrates an exemplary image used for surrogate heuristic identification. Here, image 600 includes portions 602, each of which may be selected as a standardized portion to perform surrogate heuristic identification. A visual characteristic for image 600 may be chosen. In some examples, a visual characteristic may be brightness, intensity, red/green/blue channel values, contrast, pixel count, pixel density, and others. Visual characteristics may be used to generate a histogram, as described above in connection with FIGS. 4A-4B. Any number, location, size, percentage, or shape of portions 602-608 may be selected and are not limited to the examples shown. As an example, portions (e.g., portion 602-608) may be standardized by selecting the same set, part, sub-part, size, location, percentage, or shape of data from every image used to perform surrogate heuristic identification. Another portion having substantially the same location, size, shape, or other characteristics may be selected and used to identify whether the file or data stream corresponding to the portion is a copy. In some examples, brightness of picture elements (i.e., pixels) may be used to select a given portion in image 600. In other examples, portions 602-608 may be selected from each image (e.g., image 600) using a predetermined size. In still other examples, portions 602-608 may be selected using a combination of characteristics. For example, portion 602 may be an area in which at least fifty percent of the pixels have a brightness over 175. In still other examples, portions of other images (i.e., files or data streams) may be used to select another standardized portion. Standardized portions are portions that are selected using the same characteristic or set of characteristics. For example, portions located in the lower right corner of each image are selected. As another example, portions may be selected based on having at least fifty percent of pixels with a brightness level over 175. Once selected, portions may be used for surrogate heuristic identification, as described above.

Figure 7:
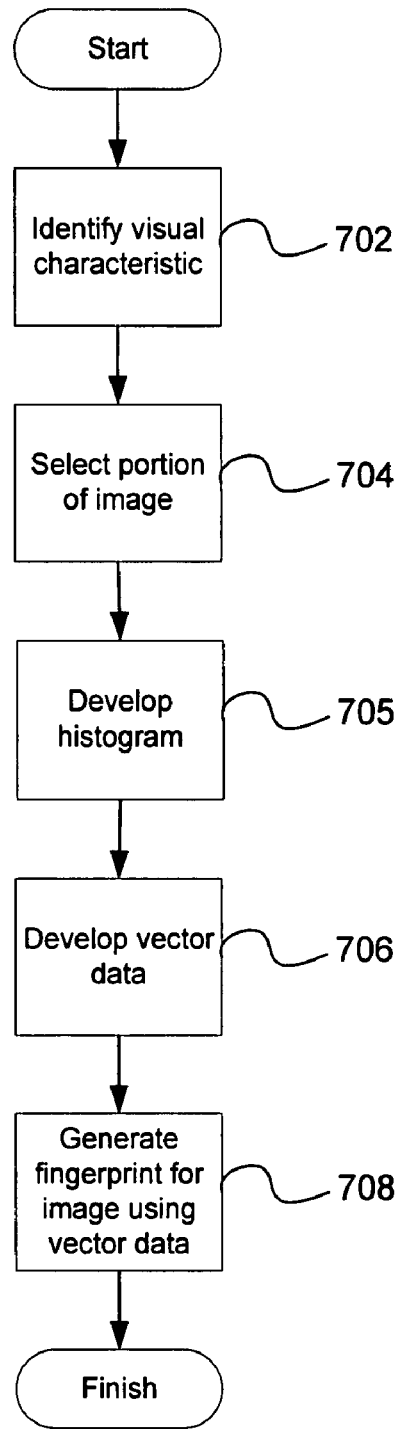
FIG. 7 illustrates an exemplary process for surrogate heuristic video identification.

FIG. 7 illustrates an exemplary process for surrogate heuristic video identification. Here, a visual characteristic is identified (702). A portion of an image, as described above, is selected (704). Using the identified visual characteristic (e.g., brightness, R/G/B color channel, pixel density, pixel count, and others), histogram data may be developed (705) using the above-described techniques. In some examples, vector data is developed (706) using the above-described techniques. Different data representations or models may be used and are not limited to histograms. Identifying the global and local maximums and minimums allows vector data to be determined. Fingerprints may be generated by encoding various histogram data, vector data, a combination thereof, or other types of data. Fingerprints may also be generated by hashing data using the techniques described and incorporated by referenced above. Additional data may be encoded into the fingerprints (708). In other examples, the above-described process may be varied and is not limited to the sub-processes, design, order, or implementations described above.

Figure 8A:
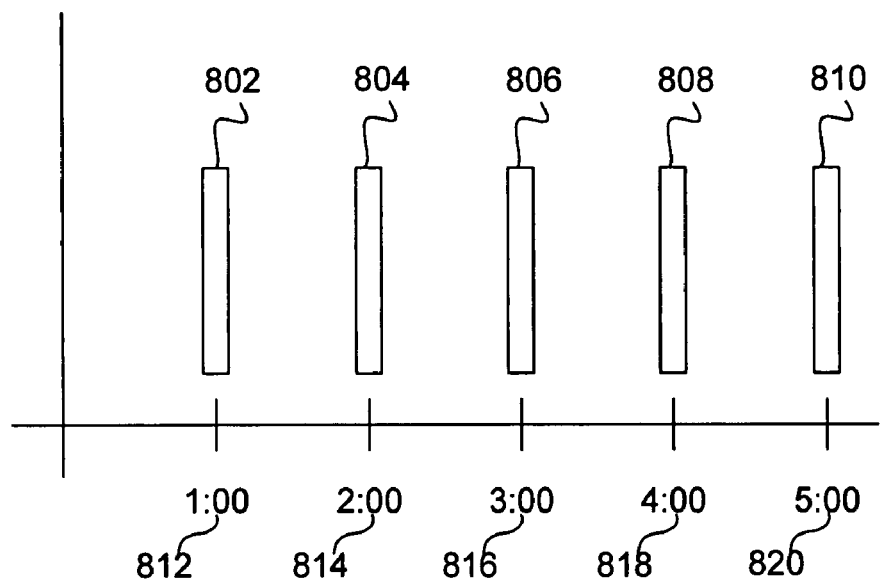
FIG. 8A illustrates exemplary video frames used in surrogate heuristic identification.

FIG. 8A illustrates exemplary video frames configured for surrogate heuristic identification. Here, frames 802-810 are indexed at time periods or intervals ("intervals") 812-820. In some examples, frames 802-810 may be of a video, multiple-framed image, or other type of file or data stream that has a temporal component (e.g., slide show, presentation, multimedia content, rich internet application, and the like) or that may be organized into discrete frames and which may be indexed at, for example, intervals 812-820 (e.g., 1:00, 2:00, 3:00, 4:00, 5:00 minutes). Frames 802-810 may be used to identify a given video or multiple-framed image. In some examples, frames 802-810 may be a subset of the frames selected from the video at predetermined times. Alternatively, the number of frames and time intervals may be varied and are not limited to the examples shown and described.

Figure 8B:
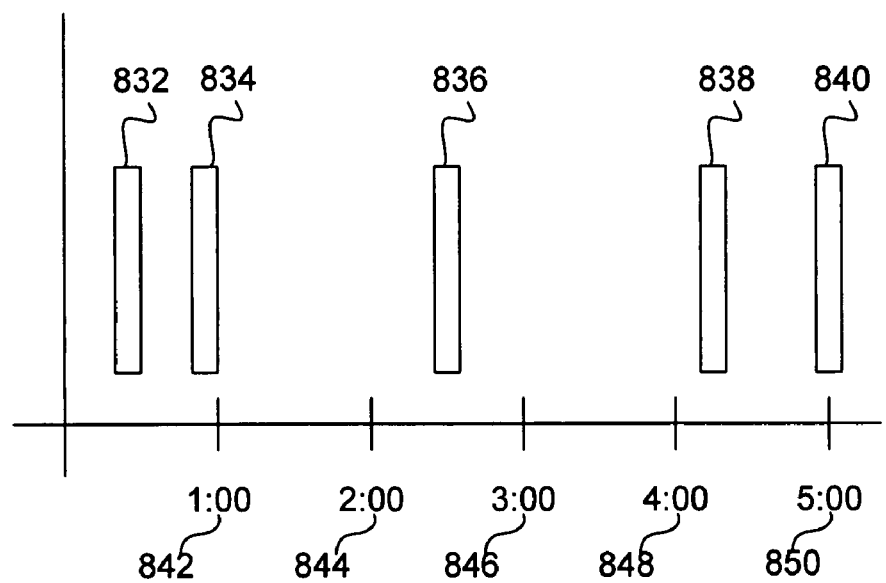
FIG. 8B is a further illustration of exemplary video frames used in surrogate heuristic identification.

FIG. 8B is a further illustration of exemplary video frames used in surrogate heuristic identification. Here, frames 832-840 at intervals 842-850 of a file or data stream (e.g., video, audio, multimedia, and the like) are shown. In some examples, frames 832-840 may be a subset of frames selected from a video file or data stream. The frames may be selected based on one or more characteristics, such as those described above. For example, frames 832-840 may be selected because they are the five brightest frames in a portion of video. As another example, frames 832-840 may be selected based on an audio track of the video. Frames 832-840 may be selected at various intervals (e.g., intervals 842-850) at which, for example, audio levels (e.g., frequencies, amplitude, and others) are at their highest level. In other examples, frames 832-840 may be selected by determining if audio characteristics are above a given threshold (e.g., volume, frequencies, amplitudes, and others). In still other examples, portions that are ignored may have no audible sounds, thus indicating a higher probability that identifiable images (e.g., black, solid, white, blue, green, or otherwise unused frames such as those found at the beginning or end of a movie) may not be present. Further, some portions of a video or multiple-framed image or presentation may have sound (e.g., dialogue, sound track, music, and others), thus indicating that images may be present that can be used for surrogate heuristic identification. The above-described examples may be varied and are not limited to the descriptions provided.

Figure 9:
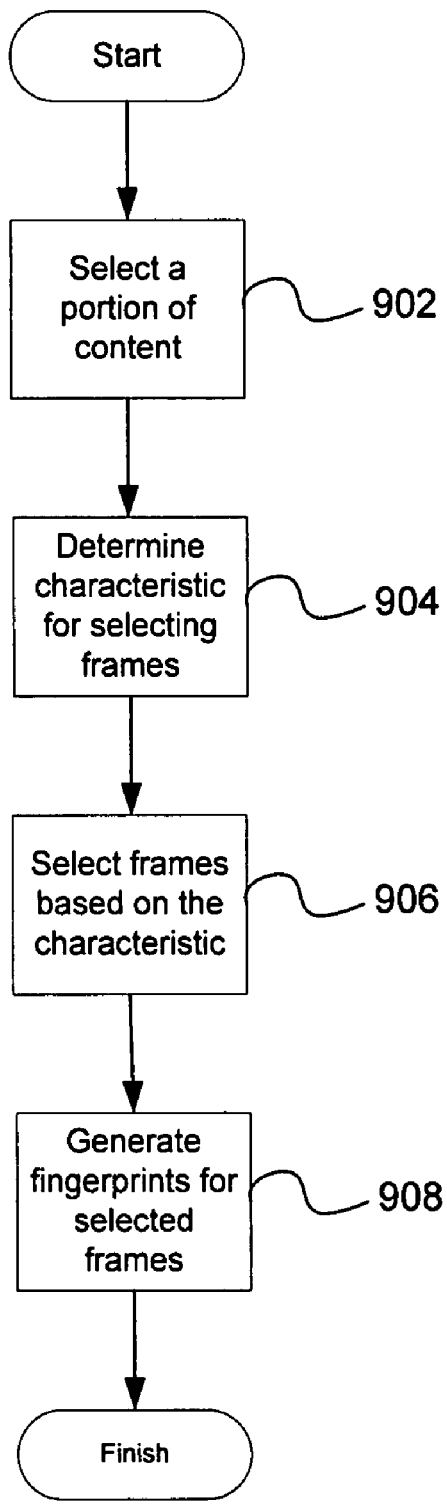
FIG. 9 is an alternative exemplary process for surrogate heuristic identification.

FIG. 9 is an alternative exemplary process for surrogate heuristic identification. Here, a portion of content is selected (902). For example, a portion may have a duration of five minutes (e.g., FIGS. 8A-8B). A characteristic may be determined and used for selecting frames within a portion (904). A portion may be identified using various criteria (e.g., first five minutes, last three minutes, brightest five minutes, loudest two minutes, portion of video with greatest motion, and the like). Characteristics may be determined automatically, systematically, manually, or pre-determined. In other examples, content (e.g., video) may be used entirely (i.e., all of the content, video, audio, image, movie, and others). Once determined, a characteristic may be used to select frames from the portion (906). In some examples, a characteristic may be a parameter that specifies that a frame is selected every minute, thirty seconds, ninety seconds, one hundred and fifty seconds, or some other periodicity. Characteristics may also be different than time. Frames may also be selected based on changes that occur. For example, the five frames with the most change from the previous frame may be selected. Color, motion, brightness, luminosity, and other visual attributes of a video may be used. As other examples, the five brightest frames, three dimmest frames, seven reddest frames, or ten frames with the most change from the previous frame may be selected. Frames may be selected because an object is presented in a given frame, a sound is associated with a given frame or the like. Each frame selected may be analyzed and catalogued as a separate segment of content. Once selected, frames may be analyzed using the processes described above to generate fingerprints. Fingerprints may be generated using techniques such as those described and referenced above. Once determined, fingerprints may be compared to determine whether a copy has been identified and located.

Alternatively, other multiple-frame files or data streams may be identified using the techniques described. For example, a slideshow, word processing document, multimedia application, webpage, and others may be represented as images. Portions may be selected from a multiple-frame file or data stream using various characteristics to determine which frames are selected. Further, after generating fingerprints for selected portions (i.e., files or data streams undergoing surrogate heuristic identification), stored fingerprints may be used (i.e., compared) to determine whether a match exists. If a match is found, then the location of the duplicate image, video, or other file or data stream may be determined, returned, stored, processed, or otherwise used.

Figure 10A:
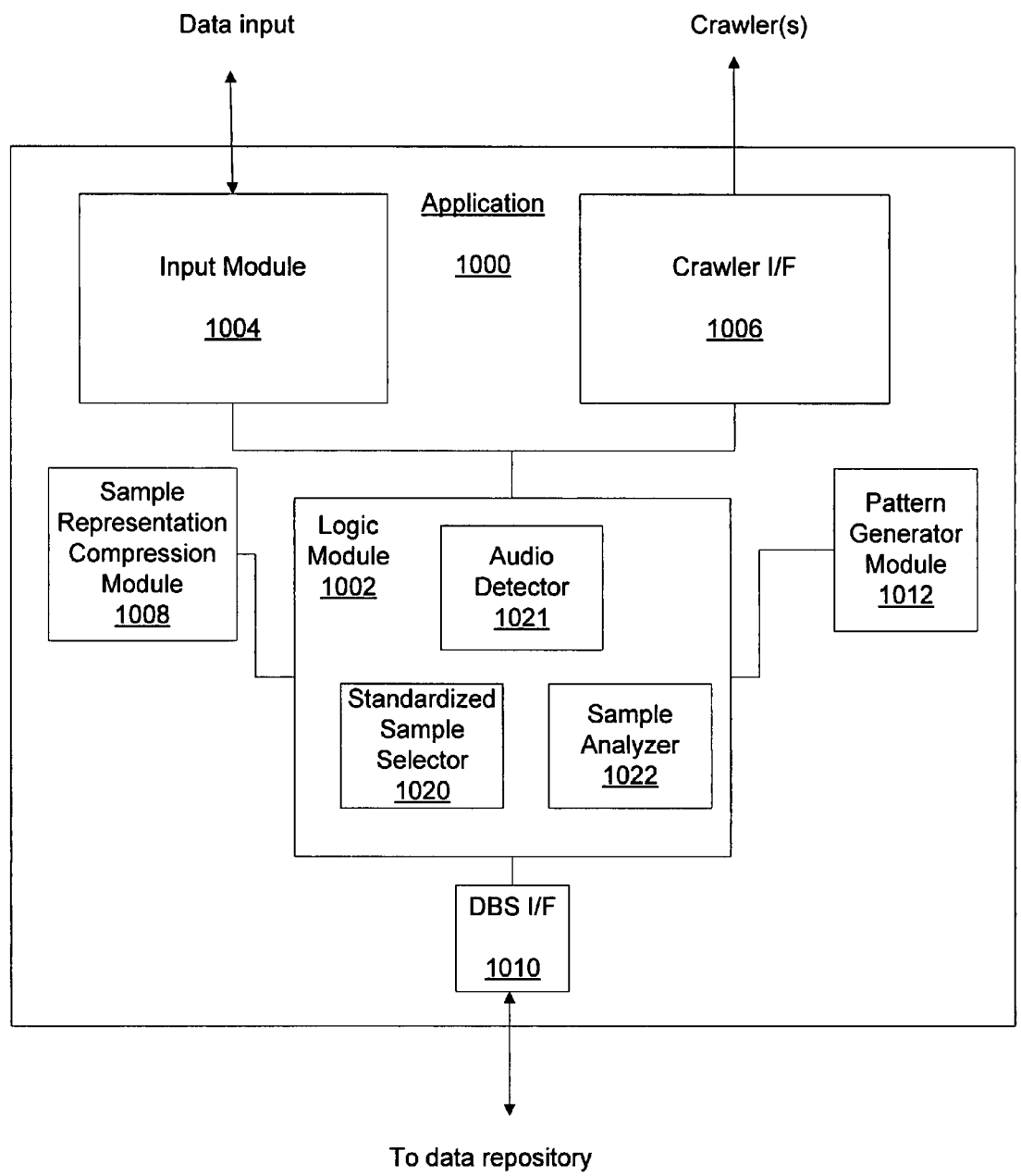
FIG. 10A illustrates an example of an application architecture for surrogate heuristic identification configured to identify audio data.

FIG. 10A illustrates an example of an application architecture for surrogate heuristic identification configured to identify audio data. Here, application 1000 may include logic module 1002, input module 1004, crawler interface ("I/F") 1006, and database system I/F 1010, all of which can include structure and/or functionality as similarly-named elements in FIG. 2. Further, application 1000 can optionally include sample representation compression module 1008 and/or pattern generator module 1012. Sample representation compression module 1008 can be configured to compress an amount of data that represents, and, thus, identifies a standardized sample, a file, or the like. As such, sample representation compression module 1008 generates a compressed representation of data, such as audio data. In one embodiment, sample representation compression module 1008 is configured to operate as hash module 208 (FIG. 2) to generate hash values as compressed representations of samples or fingerprints, based on vectors, or other data associated with a file. In at least one instance, the compressed representation (e.g., fingerprint data) can be stored in repository 110 (FIG. 1) using database system (DBS) I/F 210. Note that sample representation compression module 1008 is not limited to implementing hash module 208 to generate compressed representations. Pattern generator module 1012 can be configured to detect patterns within a standardized sample, as well as generate patterns that can distinguish one standardized sample from other standardized samples. In one embodiment, pattern generator module 1012 can be configured to operate as a histogram module 212 (FIG. 2) to generate patterns, as described by histograms, to determine vectors constructed from data associated with, for example, files found by crawlers. Note that pattern generator module 1012 is not limited to implementing histogram module 212 to generate patterns.

Figure 10B:
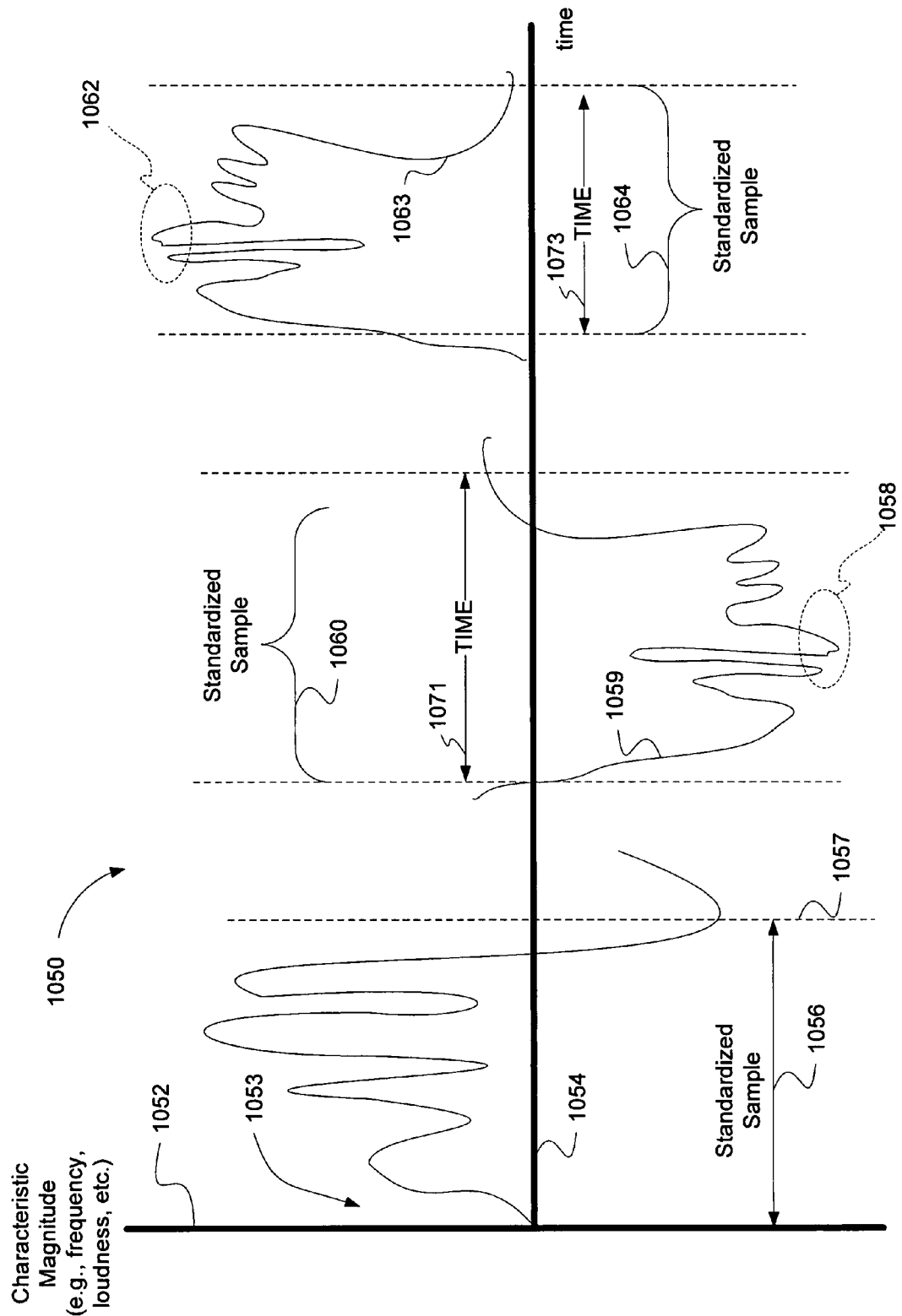
FIG. 10B depicts one example in which a standardized sample selector can select different trigger points.

In the example shown, logic module 1002 can optionally include standardized sample selector 1020, an audio detector, and a sample analyzer 1022. Standardized sample selector 1020 can be configured to select triggers points at which a standardized sample can be obtained. A trigger point, at least in some embodiments, can refer generally to a value for one or more characteristics and/or attributes that causes application 1000 to capture audio data as a standardized sample. A trigger point can be a high-valued characteristic, a low-valued characteristic, or a range of values that, when detected, will cause application 1000 to sample audio data. Examples of characteristics include frequencies, volumes, and other aural attributes that can be present in the audio. As such, a trigger point can be a frequency of an audio signal that meets or exceeds, for example, a specific frequency (e.g., a high frequency). In one embodiment, a trigger point can be the start of the audio file (e.g., zero minutes and zero seconds of playback). FIG. 10B depicts one example in which standardized sample selector 1020 selects different trigger points.

Figure 11:
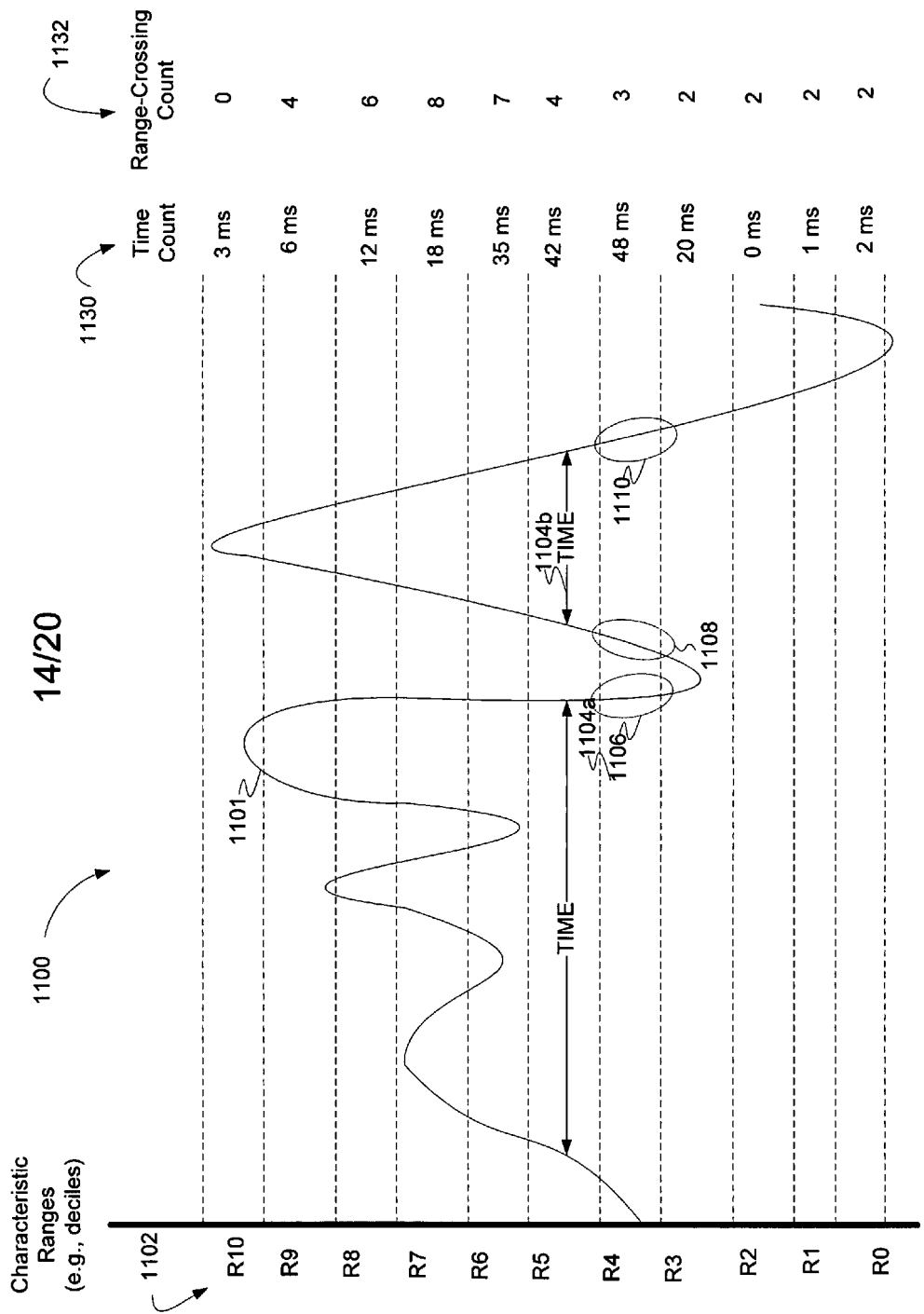
FIG. 11 depicts one example of an analysis performed by a sample analyzer to quantify a characteristic with which audio data can be identified.

Sample analyzer 1022 is configured to analyze a standardized sample to associate one or more quantities for one or more characteristics of the standardized sample. In particular, sample analyzer 1022 can operate to describe audio data in a manner that facilitates, for example, the determination of patterns with which to distinguish unique standardized samples from each other. In one embodiment, sample analyzer 1022 can decompose audio signals into any number of ranges, such as frequency ranges, for characterizing those ranges. FIG. 11 depicts one example of an analysis performed by a sample analyzer to quantify the features of a characteristic with which audio data can be identified.

Audio detector 1021 is configured to detect whether data (in a file or streaming over a network) is audio. In one case, audio detector 1021 can detect audio data as a function, in whole or in part, of a file extension that indicates an audio or video file (e.g., .wmv, .mp3, etc., indicate files). In another case, audio detector 1021 can detect audio data as a function, in whole or in part, of a MIME type (e.g., type: Audio, such as "audio/mpeg") associated with the data and/or file. Further, logic module 1002 may guide the operation of application 1000 and the various elements (e.g., input module 1004, crawler interface (I/F) 1006, database system I/F 1010, sample representation compression module 1008, and pattern generator module 1012) shown. In some examples, input module receives input via input module 1004. Data may be sent or received between application 1000 and crawlers using crawler I/F 1006. In other examples, application 1000 and the above-described elements may be varied and are not limited to the descriptions provided.

FIG. 10B depicts one example in which a standardized sample selector can select different trigger points. In the example shown, standardized sample selector 1020 (FIG. 10A) can be configured to select the beginning of the file 1053, a low-valued characteristic 1058 (e.g., a low frequency), and a high-valued characteristic 1062 (e.g., a loud noise) as triggers points at which standardized sample 1056, standardized sample 1060, and standardized sample 1062 can respectively be obtained. As shown, diagram 1050 depicts the magnitude for a characteristic being sampled as Y-axis 1052 in relation to time along X-axis 1054. Application 1000 (FIG. 10A) can capture standardized sample 1056 in response to sampling an audio from the beginning of the file (or at receipt, if streaming) to a point 1057 (e.g., the first 2 to 5 minutes). Standardized sample 1056 can be captured in response to detecting audio signal 1059 exceeding a low-valued threshold. Once detected, application 1000 can obtain standardized sample 1056 during a time interval 1071 in association with low-valued characteristic 1058 as a trigger point. Standardized sample 1064 can be captured in response to detecting audio signal 1063 exceeding a high-valued threshold. Once detected, application 1000 can obtain standardized sample 1064 during a time interval 1073 in association with high-valued characteristic 1062 as a trigger point.

FIG. 11 depicts one example of an analysis performed by a sample analyzer to quantify a characteristic with which audio data can be identified. In the example shown, sample analyzer 1022 (FIG. 10A) can be configured to select standardized sample 1100 of audio for analysis. Audio signal 1101 is configured to include audio. As shown, the sample analyzer (not shown) is configured generate a number of characteristic ranges 1102, such as ranges R0 to R10. In some cases, each of these characteristic ranges 1102 relate to a unique range of frequencies. To generate a pattern, the sample analyzer analyzes audio signal 1101 against characteristic ranges 1102 to determine, for example, a time count 1130 and/or a range-crossing count 1132. A time count 1130 indicates a number of time units that a rising edge and a falling edge of audio signal 1101 encompass an amount of time for a specific range. For example, audio signal 1101 encompasses an amount of time 1104a and another amount of time 1104b, which is shown to be 42 milliseconds (ms). A range-crossing count 1132 indicates a number of times that audio signal 1101 crosses (e.g., fully crosses) a characteristic range 1102. For example, audio signal 1101 crosses range R4 at 1106, at 1108, and 1110, all of which add up to 3 range crossings (as shown). In some cases, time count 1130 and/or a range-crossing count 1132 form the bases from which to generate patterns, as derived by, for example, histograms. In other examples, the above-described techniques for analyzing standardized sample 1100 may be varied and are not limited to the descriptions provided.

Figure 12:
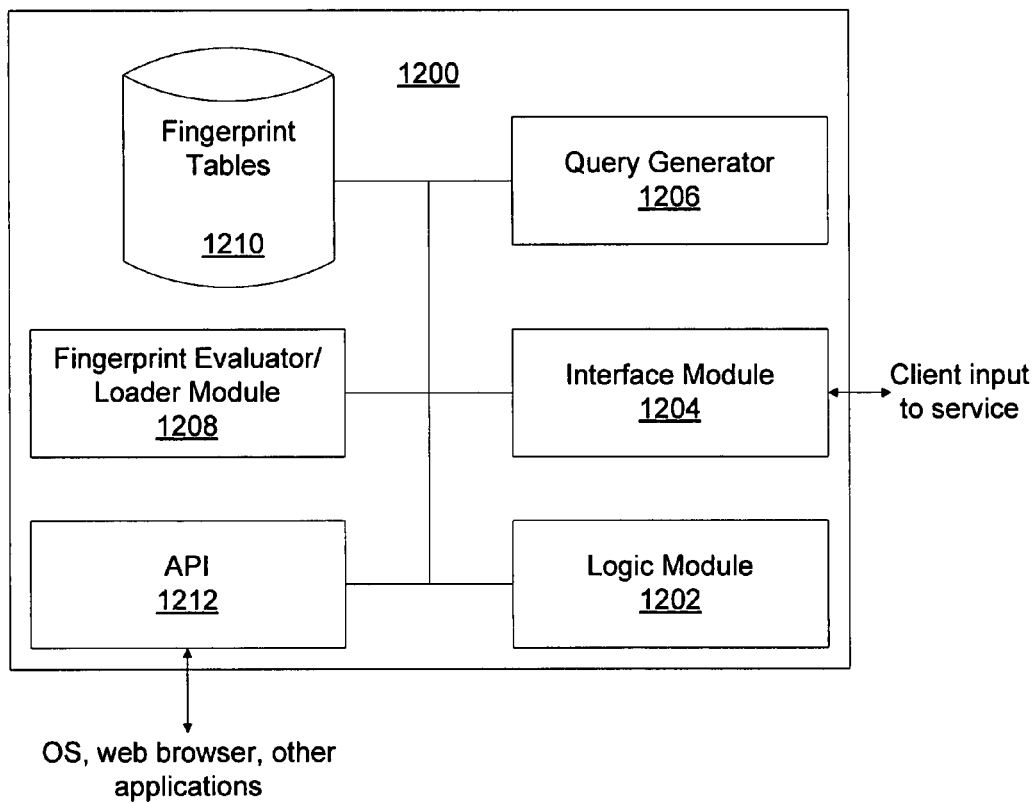
FIG. 12 illustrates exemplary surrogate heuristic identification application architecture.

FIG. 12 illustrates exemplary surrogate heuristic identification application architecture. Here, application 1200 includes logic module 1202, interface module 1204, query generator 1206, fingerprint evaluator/loader module 1208, fingerprint tables 1210, and application programming interface (API) 1212. In some examples, application 200 may be used to implement the described techniques for surrogate heuristic identification. As an example, logic module 1202 provides control and management functions for application 1200 and its associated elements (e.g., interface module 1204, query generator 1206, fingerprint evaluator/loader module 1208, fingerprint tables 1210, API 1212). In other examples, application 1200 and the described elements may be varied and are not limited to the number, type, function, design, architecture, or structure of those shown.

In some examples, input may be received by interface module 1204. Input (e.g., fingerprints, files, data streams, portions of files or data streams, and others) may be used to construct a search by query generator 1206. Once constructed, a SQL query may be run against fingerprints stored in repository 1210. Here, fingerprint evaluator/loader module 1208 may be used to compare fingerprints input by, for example, a user via a user interface. In other examples, fingerprint evaluator/loader module 1208 may be used to compare fingerprints provided by a system or other automatic or semi-automatic input. Further, fingerprint evaluator/loader module 1208 may be used to compare fingerprints against stored fingerprints in fingerprint tables 1210. When a fingerprint is used to identify a file using the techniques described above, a location, address, web page, URL, or other identifying data may be returned via API 1212. In still other examples, application 200 and the above-described elements may be varied in function, structure, and implementation and are not limited to the descriptions provided.

Figure 13:
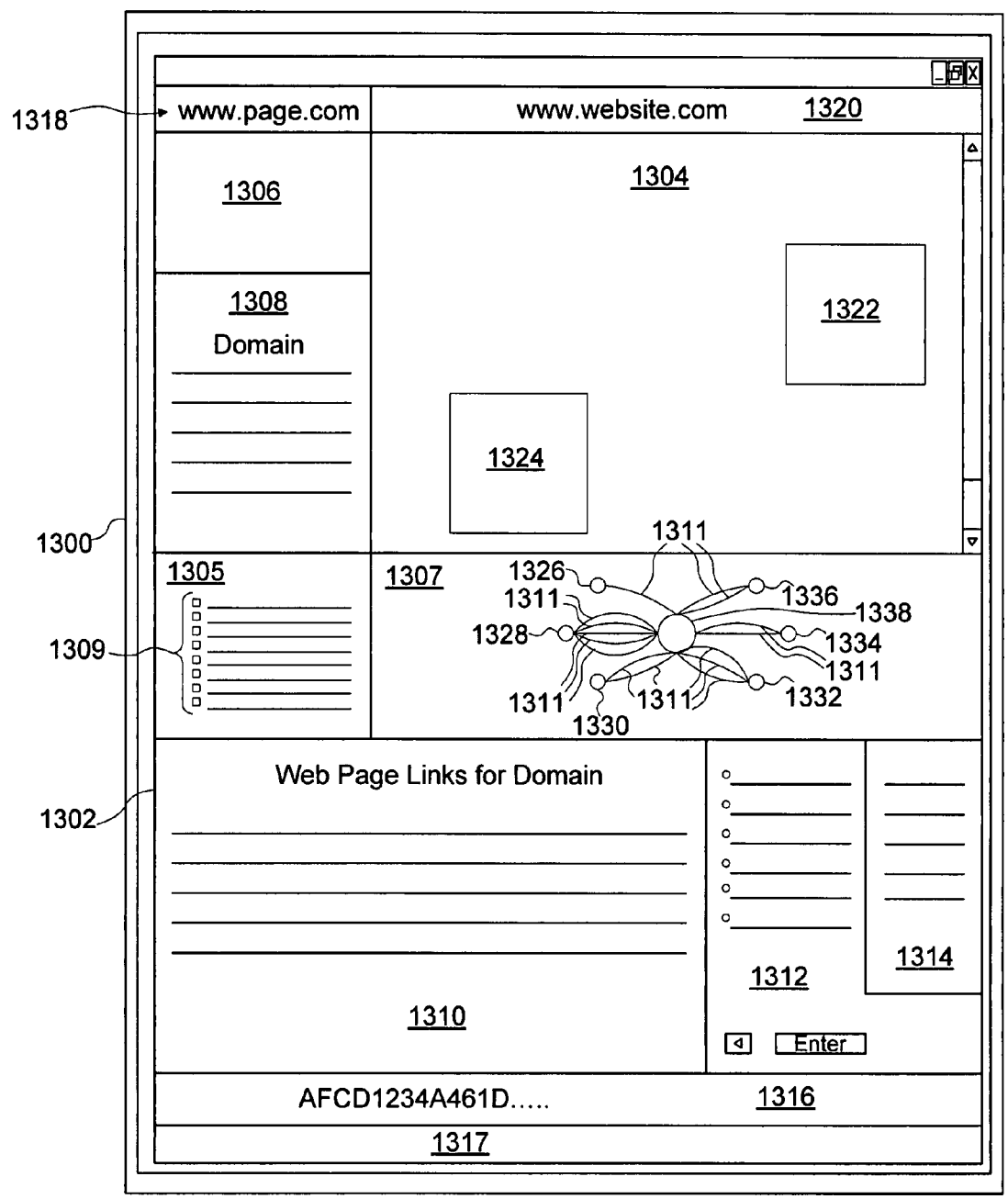
FIG. 13 illustrates an exemplary surrogate heuristic identification interface.

FIG. 13 illustrates an exemplary surrogate heuristic identification interface. Here, interface 1300 includes window 1302, panels 1304-1316, and address bars 1318-1320. In some examples, interface 1300 may be used as a "front-end" display or interface for application 1200 (FIG. 12). For example, panel 1304 may be implemented to display a web page associated with an address (e.g., URL) provided in address bar 1320. Panel 1306 may be used to display a target (i.e., a domain on which a given file or data stream is found), which may also be identified by an address (e.g., URL) displayed or provided (i.e., input into) in address bar 1318. Panels 1306 and 1304 may follow links presented in the display (e.g., hyperlinks displayed on web pages), which may be implemented as hyperlinked text or images 1322-1324 having an associated link. Domains on which a given file or data stream is found may also be listed in panel 1308. Address bar 1318 and 1320 also may be used to input a domain for study. If a given domain is a target, then 1308 may list domains that contain similar files to the target domain. Further, web page links for domains found using the described techniques may be implemented using panel 1310. Panels 1308 and 1310 may be used to provide or input data. Panels 1308-1310 may also be configured to present data as clickable (i.e., enabled for user interaction when, for example, using an input/output device (e.g., computer mouse) to interact with an on-screen icon, address, link, or other interactive element) hypertext. In some examples, panel 1312 may be used to display or input ratings provided by a user of interface 1300. For example, if a user is searching for a given file or content and application 1200 (FIG. 12) returns domains listed in panel 1308, the user may rate each result using various techniques. In some examples, ratings may be numerically-based. In other examples, ratings may be qualitative inputs (e.g., copy, not a copy, close, authorized, licensed user, and the like) provided by a user. Panel 1314 may also be used to provide inputs such as providing a numerical range of results, geographic limitations (e.g., based on an IP address), MIME type or other file determinant information, domains, fingerprints, reference IDs, row IDs (i.e., for lookup in a table, for example, stored in fingerprint tables 1310 (FIG. 13)) and others. In some examples, information and data input in panels 1304-1320 may be used as filters for searching (e.g., constructing and running queries, and the like) for a given fingerprint, file, or data stream.

In some examples, panel 1305 may be configured to display files 1309, which may be associated with a given website. A website may be, in some examples, a logical grouping of locations, files, or other content found on a website, which may be targeted for the purpose of identifying content using the described techniques. Each of files 1309 may be selected or deselected by, for example, checking or unchecking a box next to each file name. File names may be listed on a line next to each box. File names may be selected or deselected using different techniques and are not limited to the examples provided.

Panel 1307, in some examples, may be configured to display a graphical representation (e.g., a chart, an object model, or other data representation) that shows relationships (i.e., links 1311) between objects 1326-1338, with each relationship being based on files or content located on websites associated with objects 1326-1338. For example, files or other content listed in panel 1305 may be selected or deselected. As files or other content shown in panel 1305 are selected or deselected, the network of objects 1326-1338 and links 1311 may change (i.e., appear, disappear, move, and the like). In some examples, files or content may be shown as a network. In other examples, the network representation shown in panel 1307 may be modified by selecting or deselecting files or content listed in panel 1305. In some examples, selection of hosts (i.e., objects 1326-1338) may be varied by selecting a different object in panels 1307 or 1308. Further, relationships (i.e., links 1311) may also be selected in panel 1307. When an item (e.g., links 1311, objects 1326-1338) are selected, the display shown in panel 1307 may re-center, shift, move, or otherwise be displayed differently. Panel 1305 may be configured to persistently display selected or unselected files by checking or unchecking, respectively, boxes provided next to each file name associated with files or content 1309. When files or content in panel 1305 are selected, the display in panel 1307 may change (i.e., objects 1326-1338 may appear or disappear, links 1311 may vary in configuration between objects 1326-1338, links 1311 may change in numbers, and the like). Alternatively, when the display in panel 1307 is modified (e.g., re-centered, shifted, moved, or otherwise modified by selecting, for example, one or more of objects 1326-1338 or links 1311), the list of files or content in panel 1305 may change. Likewise, the list of files or content shown in panel 1305 may also remain unchanged. Still further, panel 1305 may also be configured to display updates of files or content based on selections made to items displayed in panel 1307 (e.g., objects 1326-1338, links 1311). In other examples, the above-described panels 1305 and 1307 may be varied and are not limited to the descriptions provided.

Fingerprints may, in some examples, be displayed in panel 1316, which may appear in various forms. Further searches for files, data streams, or content may be performed by entering a fingerprint into panel 1316 or another panel, which is configured to use a fingerprint as an input for performing surrogate hashing or surrogate heuristic identification to determine a value associated with the files or data streams. Any type of search algorithm or technique may be used to compare a data (e.g., a stored histogram, fingerprint, combination thereof, or others) provided in panel 1316 to other stored data, for example, in repository 110 (FIG. 1) and is not limited to any particular implementation. Panel 1317 may be used to upload files for analysis or comparison using surrogate hashing or surrogate heuristic identification. Further, surrogate hashing data or surrogate heuristic identification may be entered (i.e., input) into any of panels 1304-1317 that may be configured to search for other files, data streams, or content having substantially similar identifying data or content. For example, a fingerprint may be an identifier in hexadecimal, binary, ternary, or other types of formats and is not limited to any type or format. Interface 1300, window 1302, and panels 1304-1317 may be varied in size, shape, function, input, output, and layout, none of which are limited to the examples shown and described above.

Here, address bars 1318-1320 may be configured to allow the input of an address, location of a file, or domain. In some examples, address bars 1318-1320 may be used to enter a web, Internet address, or other location where a file or data stream is stored. A domain (e.g., a World Wide Web address, hypertext transfer protocol (HTTP) address, or other type of address) may also be used as an input to one or more of address bars 1318-1320. Further address bars 1318-1320 may also be configured to receive a fingerprint, encoded histogram data, encoded vector data, a combination thereof, or a combination thereof used with other data that, for example, is entered (i.e., using techniques such as "cut-and-paste," "copy-and-paste," and others). Once entered, a fingerprint, encoded histogram data, encoded vector data, a combination thereof, or a combination thereof used with other data may be used to search for other substantially similar files, data streams, or other content and, if found, a file, data stream, or other content may be retrieved and presented using one or more of panels 1304-1316. For example, if a domain for a website is entered into address bar 1318, the home page of the website may be shown in panel 1304. Further, the domain may also be used to show whether a file sought for comparison based on a fingerprint is located at the domain. If found, a copy of a file may also be presented along with an address, location, or other identifying information that allows a user to determine whether the file, data stream, content, or portion of content is a copy of another file, data stream, content, or portion of content associated with the input data (e.g., fingerprint, encoded histogram data, encoded vector data, a combinations thereof, or a combination thereof used with other data, and others). As an example, if a rights management agency for an artist is searching for illegally copied versions of a given artist's work, a fingerprint associated with the artist's file may be entered into panel 1316 and used to search for other files, data streams, or content having the same or substantially similar fingerprint. Files, data streams, or content with the same or substantially similar fingerprint may be shown in, for example, panel 1308 along with links to other pages within the website or to another website that may have copies of the illegally (i.e., unauthorized) copied file. In other examples, address bars 1318-1320 may be configured to input a local address of a file stored, for example, on the same system as, for example, that used to implement application 1200.

Interface 1300 and the described techniques may be used to search, find, and otherwise identify files, data streams, or other content. In some examples, content may be identifiable data found in files or data streams. In other examples, content may have different file or data types, formats, encapsulations, designs, layouts, and the like. For example, content may include images, graphics, photos, music, video, audio, and other information. A song, digital recreation of a painting, editorial article, web log (i.e., blog), photograph, and others may be content. Numerous other types of content may be sought and identified using the described techniques. Further, as described herein, content may be information or data that can be discretely sought, found, retrieved, copied, and otherwise identified using, for example, surrogate hashing, surrogate heuristic identification, and other techniques for identification. Interface 1300 or elements of interface 1300 (such as frames 1304-1320) may be used to provide inputs into a reporting system (not shown). In some examples, reporting systems of various types, versions, implementations, configurations, or platforms may be used and are not limited to any specific type of reporting system. Interface 1300 may be used as a "front-end" user interface to application 1200 and other computer programs, software, or applications that implement the logic, processes, and techniques described herein. Further, interface 1300 and the above-described elements may be varied and are not limited to the examples provided.

Figure 14A:
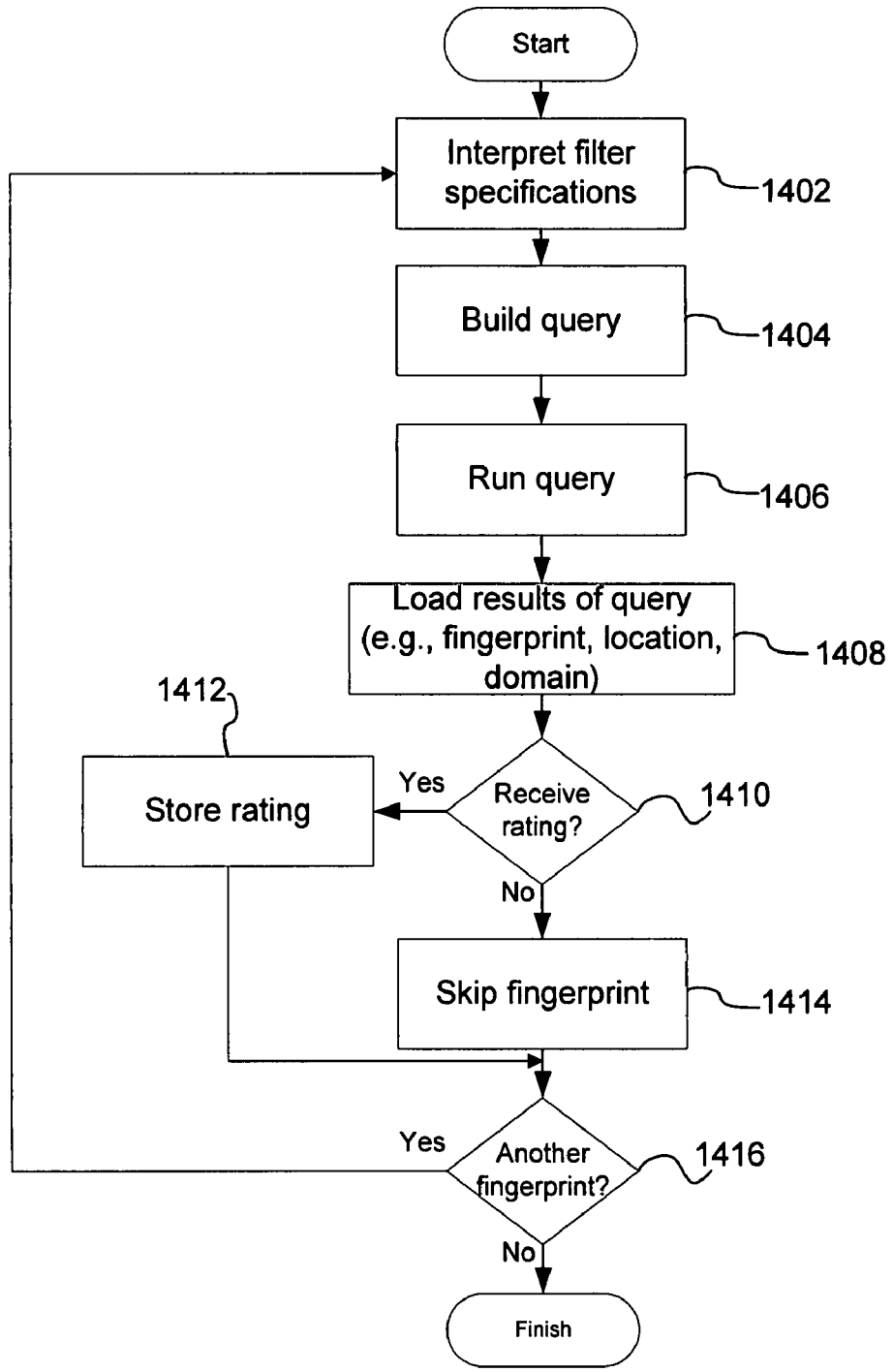
FIG. 14A illustrates an exemplary process for using a surrogate hashing or surrogate heuristic identification interface.

FIG. 14 illustrates an exemplary process for using a surrogate hashing or surrogate heuristic identification interface. Here, filters provided using interface 1300 (FIG. 13) are interpreted (1402). In some examples, filter specifications provide information that determine what criteria or parameters are used to filter searches for fingerprints performed using, for example, application 1200 (FIG. 12). Examples of filter specifications may include geography, domain name, MIME or file type, fingerprints, and others. Once interpreted, a query may be constructed (1404). In other examples, different types of search techniques may be used and modified for, as an example, different data storage facilities, structures, databases, and the like. After constructing a query using input received using interface 1300, the query is run (1406). Results from a query may be loaded, including a fingerprint, a domain, and a location (1408). Once loaded, a determination is made as to whether input has been received using, for example, interface 1300 (1410). Here, a determination is made as to whether rating input has been received regarding the search results (i.e., when copies of files or data streams have been identified, they are loaded into interface 1300 and displayed for a user to make qualitative or subjective decisions as to whether the files or data streams found are copies). In other examples, different types of input may be received apart from ratings (e.g., additional filtering criteria, comments or notes, binary actions (e.g., accept, reject), and others). If a rating is received, then the rating is stored in, for example, a repository (1412). If a rating is not received, then the fingerprint is skipped (1414). Another determination is made as to whether another fingerprint is available for processing, as described above (1416). If another fingerprint is available, then the above-described process may be repeated. If another fingerprint is not available, then the above-described process ends. In other examples, the above-described process may be varied in function, design, order, number of steps, or implementation and is not limited to the examples shown.

Figure 15A:
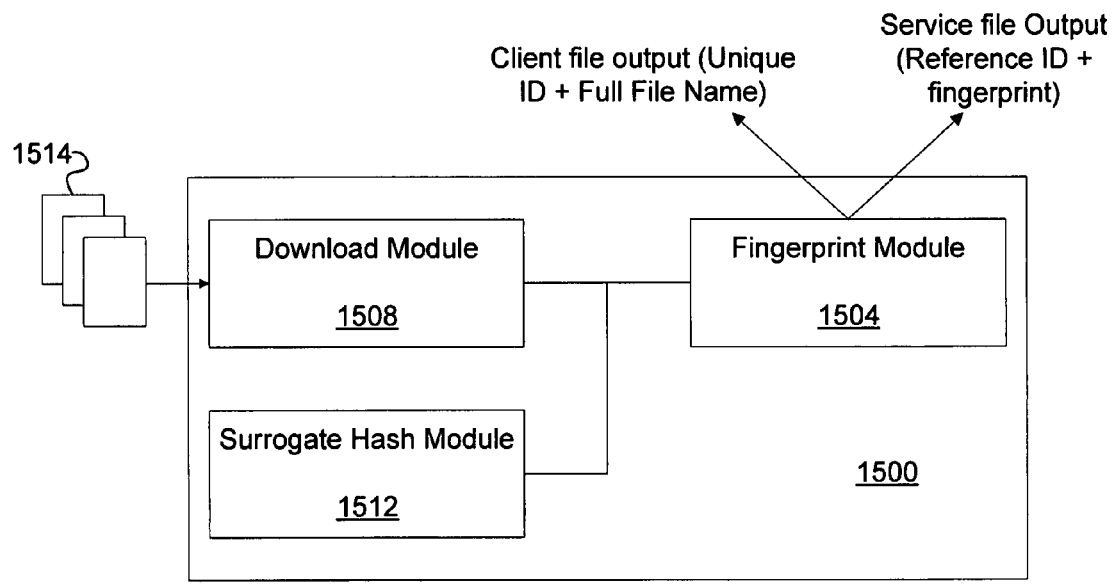
FIG. 15A illustrates an exemplary fingerprint application.

FIG. 15A illustrates an exemplary fingerprint application. Here, fingerprint application 1500 includes fingerprint module 1504, download module 1508, and surrogate hash module 1512. Fingerprint application 1500 may be implemented on a server, a client, or within another application (e.g., crawlers installed on servers 104-108 (FIG. 1)). In some examples, download module 1508 receives or retrieves files or data stream 1514, which is used to generate a fingerprint. When generating a fingerprint, surrogate hash module 1512 may be used to hash files or data streams 1514 using techniques such as those described and references above. Further, fingerprint module 1504 generates fingerprints for content. In some examples, fingerprints are output to clients (e.g., users, user interfaces, and others) and service recipients (e.g., application 1200 (FIG. 12)). In other words, client files and service files including the above-described information may be generated by fingerprint application 1500 and output by fingerprint module 1504. Fingerprints may include, for example, a unique reference identifier (ID) and a full file name (e.g., an address or other locating information). Fingerprints may also include a reference ID and a fingerprint, such as those described above in connection with FIG. 13. In other examples, fingerprints application 1500 and the described elements may be varied in function, structure, and implementation and are not limited to the examples provided.

Figure 15B:
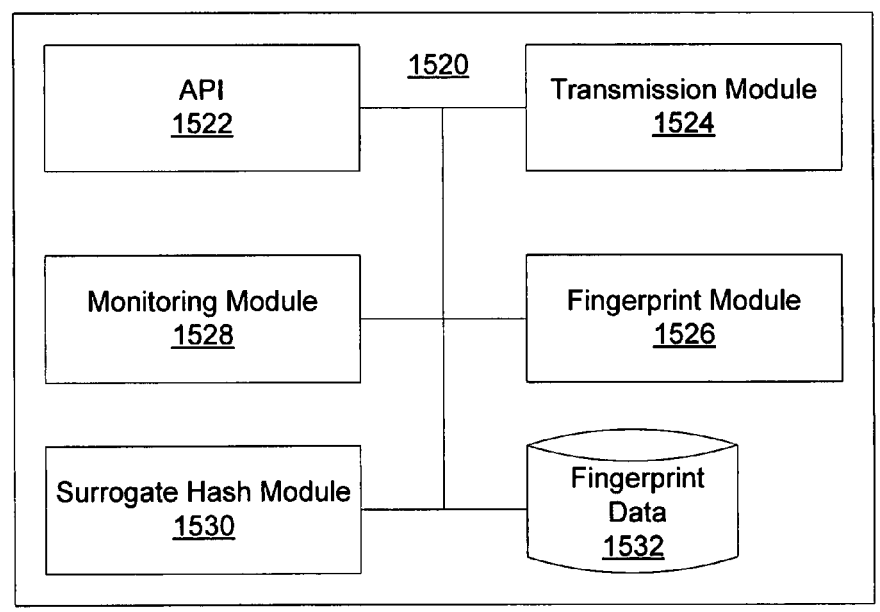
FIG. 15B illustrates an alternative exemplary fingerprint application.

FIG. 15B illustrates an alternative exemplary fingerprint application. Here, fingerprint application 1520 may include API 1522, transmission module 1524, fingerprint module 1526, monitoring module 1528, surrogate hash module 1530, and fingerprint data 1532. In other examples, the number, type, function, structure, and operation of fingerprint application 1520 and elements 1522-1532 may be varied and is not limited to those shown. Here, data may be input using API 1522 or, for example, transmission module 1524, which may transmit data using various wired and wireless techniques (e.g., Ethernet, LAN, Gigabit Ethernet, Bluetooth, IEEE 802.11x, and others). Further, monitoring module 1528 may monitor or observe files or data streams provided via API 1522 from a crawler, for example. As a monitoring service, fingerprint application 1520 may be implemented locally or remotely on a data network to find, catalog (i.e., index), and fingerprint content, files, or data streams. Fingerprints are then stored in fingerprint data 1532. In some examples, fingerprint data may include file names, file paths, machine names, user names, and other data. In other examples, fingerprint application 1520 and the above-described elements may be varied and are not limited to those shown and described.

Figure 16:
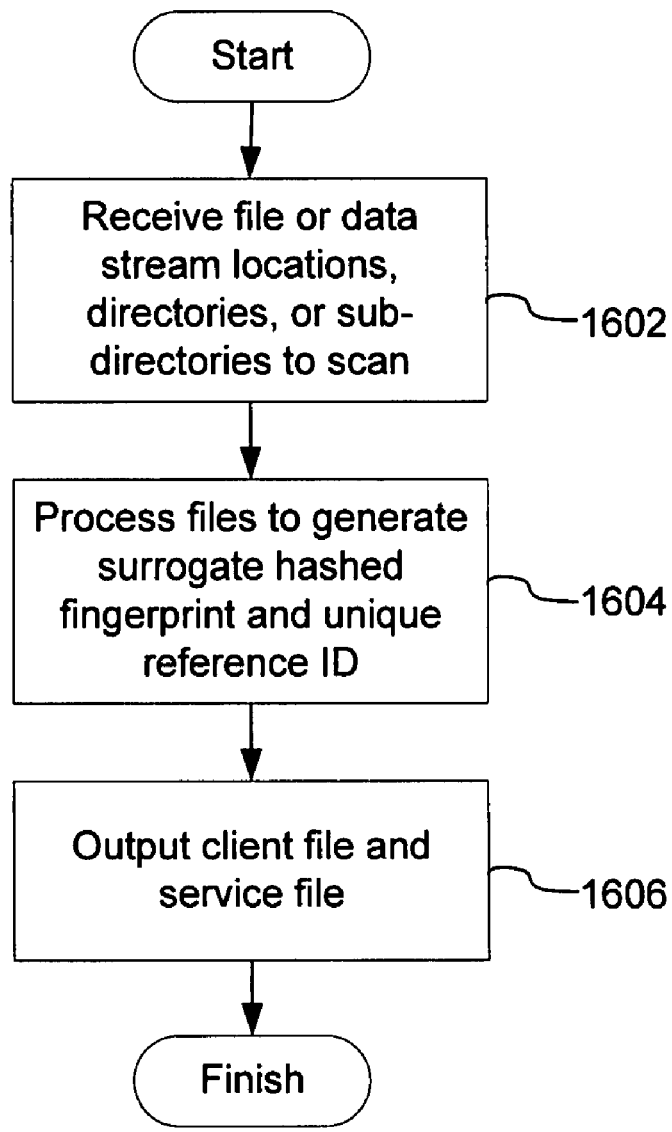
FIG. 16 illustrates an exemplary surrogate heuristic identification sub-process for generating a fingerprint.

FIG. 16 illustrates an exemplary surrogate heuristic identification sub-process for generating a fingerprint. Here, a file or data stream is received (1602). In some examples, a file or data stream may also indicate a location, directory, sub-directory, table, or provide other data or information that identifies which files or data streams to fingerprint and compare. Once received, files or data streams are then processed as described above, to generate surrogate hashed fingerprint and unique reference IDs for each file or data stream. In some examples, files or data streams may be hashed using surrogate hashing techniques such as those described in U.S. patent application Ser. No. 11/408,199, which is herein incorporated by reference for all purposes. Once hash values have been generated, then a client file and a service file may be output (1606). Client file and service files may include information as described above in connection with FIG. 15A. The above-described process may be varied in design, function, and implementation and is not limited to the examples provided above.

Figure 17:
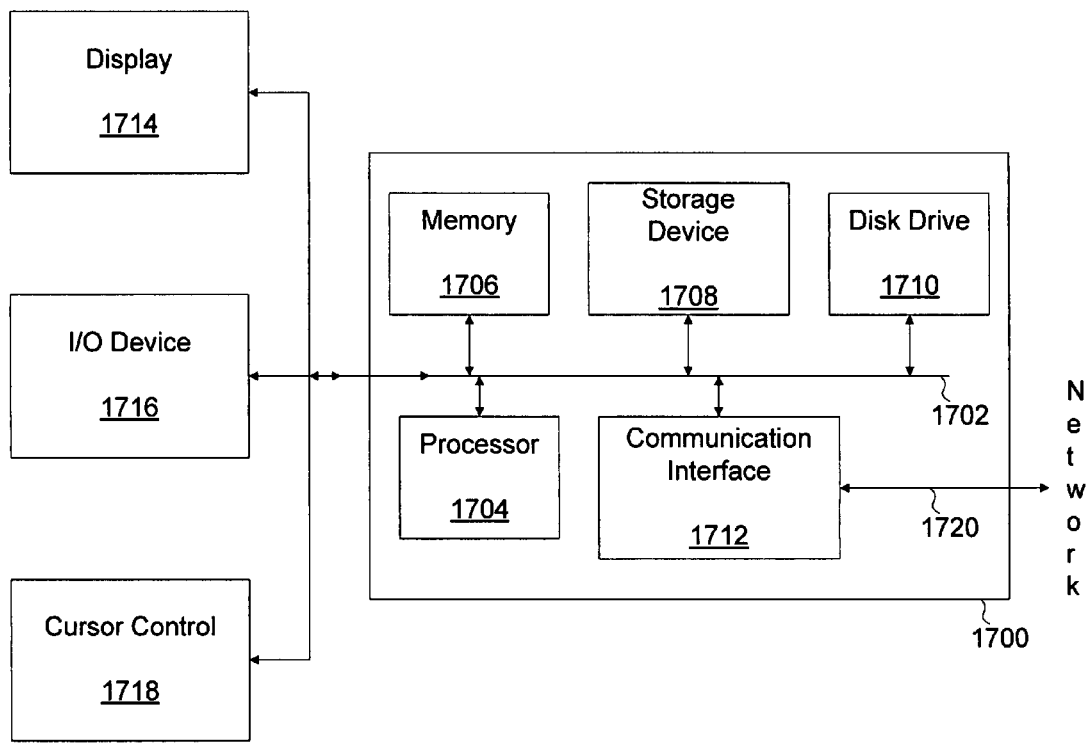
FIG. 17 is a block diagram illustrating an exemplary computer system suitable for surrogate heuristic identification.

FIG. 17 illustrates an exemplary computer system suitable for surrogate heuristic identification. In some examples, computer system 1700 may be used to implement computer programs, applications, methods, processes, or other software to perform the above-described techniques. Computer system 1700 includes a bus 1702 or other communication mechanism for communicating information, which interconnects subsystems and devices, such as processor 1704, system memory 1706 (e.g., RAM), storage device 1708 (e.g., ROM), disk drive 1710 (e.g., magnetic or optical), communication interface 1712 (e.g., modem or Ethernet card), display 1714 (e.g., CRT or LCD), input device 1716 (e.g., keyboard), and cursor control 1718 (e.g., mouse or trackball).

According to some examples, computer system 1700 performs specific operations by processor 1704 executing one or more sequences of one or more instructions stored in system memory 1706. Such instructions may be read into system memory 1706 from another computer readable medium, such as static storage device 1708 or disk drive 1710. In some examples, hard-wired circuitry may be used in place of or in combination with software instructions for implementation.

The term "computer readable medium" refers to any medium that participates in providing instructions to processor 1704 for execution. Such a medium may take many forms, including but not limited to, non-volatile media, volatile media, and transmission media. Non-volatile media includes, for example, optical or magnetic disks, such as disk drive 1710. Volatile media includes dynamic memory, such as system memory 1706. Transmission media includes coaxial cables, copper wire, and fiber optics, including wires that comprise bus 1702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 1700. According to some examples, two or more computer systems 1700 coupled by communication link 1720 (e.g., LAN, PSTN, or wireless network) may perform the sequence of instructions in coordination with one another. Computer system 1700 may transmit and receive messages, data, and instructions, including program (i.e., application code) through communication link 1720 and communication interface 1712. Received program code may be executed by processor 1704 as it is received, and/or stored in disk drive 1710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
    selecting, in at least one computing device, a portion of video content, wherein the portion is standardized and corresponds to an area of pixels in which at least a threshold number of the pixels embody a characteristic;
    using the characteristic embodied in the portion of the video content to generate a data representation of the portion of the video content, the data representation being used to provide heuristic data; and
    processing the heuristic data to generate a fingerprint configured to compare one or more stored fingerprints associated with other video content.

2. The method of claim 1, further comprising storing the fingerprint.

3. The method of claim 1, wherein the video content comprises an image.

4. The method of claim 1, wherein the characteristic is brightness meeting a brightness threshold.

5. The method of claim 1, wherein the characteristic is a color channel value meeting a color channel value threshold.

6. The method of claim 1, wherein the fingerprint comprises encoded heuristic data.

7. The method of claim 1, wherein the portion comprises all of the video content.

8. The method of claim 1, wherein the heuristic data comprises one or more vectors.

9. The method of claim 1, wherein the heuristic data comprises a histogram.

10. The method of claim 1, wherein the heuristic data comprises vector data and histogram data.

11. The method of claim 1, wherein processing the heuristic data further comprises using heuristic data to generate the fingerprint.

12. The method of claim 1, wherein processing the heuristic data further comprises generating a hash value using a first hashing algorithm.

13. The method of claim 1, wherein a first hashing algorithm is run against the fingerprint to generate a first hash value.

14. The method of claim 13, wherein a second hashing algorithm that is different from the first hashing algorithm is run against the fingerprint to generate a second hash value.

15. The method of claim 1, wherein the heuristic data is normalized.

16. The method of claim 1, wherein generating the histogram comprises counting occurrences of the characteristic.

17. The method of claim 1, wherein the characteristic is contrast meeting a contrast threshold.

18. The method of claim 1, wherein the characteristic is pixel density meeting a pixel density threshold.

19. The method of claim 1, further comprising:
running a first hashing algorithm against the portion to generate a first hash value, and running a second hashing algorithm against the portion to generate a second hash value, wherein the first hashing algorithm and the second hashing algorithm are different;
determining whether the first hash value and the second hash value are substantially similar to one or more stored hash values associated with another portion, the another portion being substantially similar to the portion; and
identifying a location of the video content associated with the portion if the first hash value and second hash value are substantially similar to the one or more stored hash values.

20. A computer program product embodied in a non-transitory computer readable medium, comprising computer instructions for:
selecting a portion of video content, wherein the portion is standardized and corresponds to an area of pixels in which at least a threshold number of the pixels embody a characteristic;
using the characteristic embodied in the portion of the video content to generate a data representation of the portion of the video content, the data representation being used to provide heuristic data; and
processing the heuristic data to generate a fingerprint configured to compare against one or more stored fingerprints associated with other video content.

21. A system, comprising:
means for selecting a portion of video content in at least one computing device, wherein the portion is standardized and corresponds to an area of pixels in which at least a threshold number of the pixels embody a characteristic;
means for using the characteristic embodied in the portion of the video content to generate a data representation of the portion of the video content, the data representation being used to provide heuristic data; and
means for processing the heuristic data to generate a fingerprint configured to compare against one or more stored fingerprints associated with other video content.

* * * * *